US012703018B2

(12) United States Patent
Tour et al.

(10) Patent No.: US 12,703,018 B2
(45) Date of Patent: Aug. 11, 2026

(54) ULTRAFAST FLASH JOULE HEATING SYNTHESIS METHODS AND SYSTEMS FOR PERFORMING SAME

(71) Applicant: William Marsh Rice University, Houston, TX (US)

(72) Inventors: James M. Tour, Houston, TX (US); Bing Deng, Houston, TX (US)

(73) Assignee: William Marsh Rice University, Houston, TX (US)

( * ) Notice: Subject to any disclaimer, the term of this patent is extended or adjusted under 35 U.S.C. 154(b) by 412 days.

(21) Appl. No.: 18/263,831

(22) PCT Filed: Feb. 2, 2022

(86) PCT No.: PCT/US2022/014923
§ 371 (c)(1),
(2) Date: Aug. 1, 2023

(87) PCT Pub. No.: WO2022/169859
PCT Pub. Date: Aug. 11, 2022

(65) Prior Publication Data
US 2024/0116094 A1 Apr. 11, 2024

Related U.S. Application Data

(60) Provisional application No. 63/144,862, filed on Feb. 2, 2021.

(51) Int. Cl.
*B09C 1/08* (2006.01)

(52) U.S. Cl.
CPC .................................... *B09C 1/085* (2013.01)

(58) Field of Classification Search
CPC .................................. B09C 1/085; G06F 1/26
See application file for complete search history.

(56) References Cited

U.S. PATENT DOCUMENTS 4,432,666 A * 2/1984 Frey ...................... C02F 11/008
976/DIG. 394
4,707,230 A * 11/1987 Ajami ...................... C25B 3/25
585/641

(Continued)

FOREIGN PATENT DOCUMENTS

JP 2022078800 A * 5/2022
WO WO-9828046 A1 * 7/1998 ............... B09B 3/70

OTHER PUBLICATIONS

Electrokinetic remediation of diesel-contaminated silty sand under continuous and periodic voltage application; Gholamreza Asadollahfardi, Milad Rezaee; 2019; URL: https://www.koreascience.or.kr/article /JAKO201928462662249.pdf (Year: 2019).*

*Primary Examiner* — Edwin J Toledo-Duran
(74) *Attorney, Agent, or Firm* — Dickinson Wright PLLC; Ross Spencer Garsson

(57) ABSTRACT

Method and system for soil remediation by flash Joule heating. A contaminated soil that includes organic pollutants and/or one or more metal pollutants can be mixed with carbon black or other conductive additive to form a mixture. The mixture then undergoes flash Joule heating to clean the soil (by the decomposing of the organic pollutants and/or removing of the one or more toxic metals, such as by vaporization).

29 Claims, 35 Drawing Sheets

(56) References Cited

U.S. PATENT DOCUMENTS 4,775,450 A * 10/1988 Ajami ........................ C25B 3/25 588/303
4,861,484 A * 8/1989 Lichtin .................. B01J 21/063 210/759
4,957,393 A * 9/1990 Buelt ...................... B09C 1/067 405/128.6
5,074,986 A * 12/1991 Probstein ............ E21B 43/2401 204/515
5,240,570 A * 8/1993 Chang ..................... B09C 1/085 204/515
5,398,756 A * 3/1995 Brodsky .................. C09K 8/62 204/515
5,458,747 A * 10/1995 Marks .................... B01D 61/42 205/702
5,476,992 A * 12/1995 Ho .......................... B09C 1/085 588/302
5,505,925 A * 4/1996 Fristad ...................... B09C 1/02 423/109
5,545,803 A * 8/1996 Heath ....................... B09C 1/06 588/253
5,656,144 A * 8/1997 Hoover ..................... B09C 1/08 205/687
5,738,778 A * 4/1998 Doring .................... B09C 1/002 205/744
5,908,267 A * 6/1999 Schuring ................... B09C 1/10 588/253
5,914,020 A * 6/1999 Griffith ................... E21B 43/00 166/276
6,193,867 B1 * 2/2001 Hitchens ................ B01D 61/56 204/515
6,221,224 B1 * 4/2001 Hitchens ................. B09C 1/085 588/302
6,280,601 B1 * 8/2001 Doring ...................... B09C 1/08 205/744
6,391,184 B1 * 5/2002 Orolin ....................... B09C 1/10 204/278
2005/0077249 A1 * 4/2005 Kerfoot ................... B09C 1/002 210/170.07
2005/0252775 A1 * 11/2005 Malone ................... E04G 23/08 204/648
2011/0268507 A1 * 11/2011 Guo ........................ B09C 1/085 700/297
2015/0056021 A1 * 2/2015 Guo .......................... B09C 1/02 405/263
2019/0314876 A1 * 10/2019 Oberle ...................... B09B 3/45
2020/0260533 A1 * 8/2020 Crownover .............. H05B 3/46
2021/0229106 A1 * 7/2021 Meegoda .................. B09C 1/08
2022/0252260 A1 * 8/2022 Spiros ....................... F23G 5/46
2023/0381842 A1 * 11/2023 Kvapil .................... B09C 1/085

* cited by examiner

Quartz
Calcite
r-Soil
c-Soil
Intensity (arb. units)
2θ (°)
10 20 30 40 50 60 70 pyrene + soil + CB
After FJH
Before FJH
D
G
2D
Intensity (a.u.)
Raman Shift (cm⁻¹)
1000
1500
2000
2500
3000 fluorene + soil + CB
After FJH
Before FJH
D
G
2D
Intensity (a.u.)
Raman Shift (cm-1)

benz[a]athene + soil + CB
After FJH
Before FJH
D
G
2D
Intensity (a.u.)
Raman Shift (cm-1)
1000
1500
2000
2500
3000

ULTRAFAST FLASH JOULE HEATING SYNTHESIS METHODS AND SYSTEMS FOR PERFORMING SAME

CROSS-REFERENCE TO RELATED PATENT APPLICATIONS

This application is a 35 U.S.C. § 371 national application of PCT Application No. PCT/US22/14923, filed on Feb. 2, 2022, entitled "Ultrafast Flash Joule Heating Synthesis Methods And Systems For Performing Same", which claims priority to U.S. Provisional Patent Application Ser. No. 63/144,862, filed Feb. 2, 2021, entitled "Ultrafast Flash Joule Heating Synthesis Methods And Systems For Performing Same," and which patent applications are commonly owned by the owner of the present invention. These patent applications are hereby incorporated by reference in their entirety for all purposes.

The present invention is also related to PCT Patent Appl. Nos. PCT/US21/52030, PCT/US21/52043, PCT/US21/52057, and PCT/US21/52070, each of which filed Sep. 24, 2021, entitled "Ultrafast Flash Joule Heating Synthesis Methods And Systems For Performing Same," to James M. Tour, et al. (collectively, the "Tour PCT September 2021 Applications"), and which patent applications are commonly owned by the owner of the present invention.

The present invention is also related to PCT International Patent Appl. Publ. No. WO/2020/051000, entitled "Flash Joule Heating Synthesis Method And Compositions Thereof," filed Aug. 23, 2019 and published Mar. 12, 2020, to James M. Tour, et al. ("Tour PCT '000 Application"), which patent application is commonly owned by the owner of the present invention.

Each of these above-referenced patent applications are incorporated herein in their entirety.

GOVERNMENT INTEREST

This invention was made with government support under Grant No. FA9550-19-1-0296, awarded by the United States Air Force Office of Scientific Research and Grant No. W912HZ-21-2-0050, awarded by the United States Army Corps of Engineers, ERDC. The United States government has certain rights in the invention.

TECHNICAL FIELD

The present invention relates to ultrafast flash Joule heating synthesis methods and systems, and more particularly, methods and systems for soil remediation by flash Joule heating.

BACKGROUND

Soil contamination is a serious global environmental crisis due to rapidly expanding industrial activities, mining tailings, overuse of agricultural chemicals, and improper waste disposal. [Hou 2020; Wuana 2011; Mueller 2012]. Depending on the pollution sources [Hou 2020], the most common contaminants in soil include:

(A) toxic heavy metals [Hou 2020; Xu 2019; Ruhl 2009], such as lead (Pd), arsenic (As), zinc (Zn), cobalt (Co), cadmium (Cd), copper (Cu), mercury (Hg), and nickel (Ni), and other metal pollutants, such as metals, metalloids, rare earth metals, main group metals, and transition metals; and (B) organic compounds such as polycyclic aromatic hydrocarbons (PAH) [Hussar 2012; Zhang S 2017; Gan 2009], polychlorinated biphenyl (PCB) [Chekol 2004], organochlorine pesticides (OCP) [Liu 2021], total petroleum hydrocarbons (TPH) [Streche 2018], and per- and polyfluoroalkyl substances (PFAS) [Chen II 2021]. (PFAS include perfluorosulfonic acids, such as the perfluorooctanesulfonic acid (PFOS), and perfluorocarboxylic acids, such as the perfluorooctanoic acid (PFOA)). Certain organic pollutants persist in soil because of their high affinity with soil particles, resulting in continuous soil degradation over time. [Ehlers 2003].

For example, PFAS (such as PFOS and PFOA) are known to persist in the environment, as commonly described as persistent organic pollutants (also known as "forever chemicals). [Wikipedia Page for PFAS]. According to the OECD, there are at least 4,730 different PFAS with at least three perfluorinated carbon atoms. [OECD 2007; Wikipedia Page for PFAS] A U.S. Environmental Protection Agency (EPA) toxicity database, DSSTox, lists 10776 PFASs. [US EPA 2021; Wikipedia Page for PFAS] A subgroup, the fluorosurfactants or fluorinated surfactants, have a fluorinated tail and a hydrophilic head and are thus surfactants. They are more effective at reducing the surface tension of water than comparable hydrocarbon surfactants. These includes PFOS and PFOA. Residues have been detected in humans and wildlife [Houde 2006; CDC 2021; Wikipedia Page for PFAS], with health concerns resulting in litigation. In 2021, Maine became the first US state to ban such substances in all products by 2030, except in instances deemed "currently unavoidable." [Perkins 2021; Lim 2021; Wikipedia Page for PFAS].

Soil contamination poses severe risks to humans and the ecosystem by damaging the water quality and food chain [Guo 2020] and reducing land usability for agriculture [Hou 2020; Wuana 2011], which requires urgent and efficient soil remediation practices. For instance, persistent exposure to the heavy metals can cause cancer and disrupt the central and peripheral nervous systems. Many widespread poisoning incidents have resulted. [Williams 2009].

Existing technologies for remediation of heavy metal-contaminated soil include immobilization [Guo 2006; Bolan 2014], soil washing [Dermont 2008; Lestan 2008], and bioremediation [Hou 2020; Salt 1995].

The immobilization method involves the addition of high-surface-area sorbents or binding agents into the contaminated soil to decrease the mobility of heavy metals and their bioavailability. [Guo 2006]. However, the capture speed is usually slow and the capacity is limited because of the nature of physicochemical adsorption. [Bolan 2014].

Soil washing relies on the use of strong chelating agents to remove the toxic metal cations from the surface particles of contaminated soil. [Dermont 2008]. However, the soil washing method suffers from high consumption of chelating agents and large wastewater streams that could introduce secondary pollution. [Lestan 2008].

Bioremediation is proposed to be a cost-effective and ecologically sustainable alternative to traditional physical or chemical processes. [Hou 2020; Salt 1995]. However, the treatment time is long and thus not preferable for addressing immediate remediation that is needed for urgent pollution treatment. [Zhang 2015].

In addition, the heavy metals usually have different occurrences, speciation, and biogeochemical properties, and hence they show differences in toxicity, mobility, and bioavailability. [Wuana 2011]. This calls for high versatility of a specific remediation method considering that multiple different pollutants could be in contaminated soils. [Tripathi 2015].

Remediation of organic-contaminated soils is usually different than those treatments for metal-contaminated soils. The applicable approaches include thermal desorption by heating for treatment of volatile and semi-volatile contaminants [Zhao 2019], advanced oxidation processes to convert organic pollutants into harmless chemicals [Zhang H 2017; Zhou 2019], soil fluxing enhanced by the use of surfactants [Mulligan 2001], and bioremediation [Ye 2017]. There are some disadvantages of these remediation processes: the thermal remediation process is highly energy consuming [Kingston 2012]; the bioremediation process is sustainable yet it is often specific and lacks universality [Vidali 2001]; and the soil washing can generate much wastewater which could produce secondary pollution [Griffiths 1995].

In many cases, multiple approaches are required to address co-contamination of soil by heavy metals and organic contaminants, which inevitably increases the cost and energy consumption. Even worse, multiple pollutants could interfere or compete to reduce the efficiency of remediation. [Dong 2013; Liu 2008]. For example, highly concentrated heavy metals inhibit microbial metabolism activities and hence reduce the degradation efficiency of organic pollutants. [Dong 2013].

With the increasing occurrence of co-contaminated soils [Ye 2017; Ma 2010], it is necessary to develop an efficient technology to remove multiple pollutants using the same process. Hence, developing a process that is energy-saving, environmentally friendly, and universal is highly desirable.

SUMMARY OF THE INVENTION

The present invention relates to ultrafast flash Joule heating synthesis methods and systems, and more particularly, methods and systems for soil remediation by flash Joule heating. The processes can be completely dry and involve no use of solvents or expensive chemicals.

Embodiments of the present invention include processes based on the flash Joule heating to simultaneously decompose the organic pollutants while removing heavy metals in contaminated soils. The contaminated soil was mixed with carbon black (and this can be substituted with other conductive carbons, as described below) and underwent high-temperature flash Joule heating. Much of organic pollutants in soils are converted into flash graphene, a stable and non-toxic form of carbon. On the other hand, the toxic heavy metals are evaporated as a result of the ultrahigh temperatures during the flash Joule heating process, and the metals can be collected in a cooler zone.

In general, in one embodiment, the invention features a method of soil remediation. The method includes mixing contaminated soil with a conductive additive to form a mixture. The contaminated soil includes one or more pollutants. The method further includes applying a voltage across the mixture. The voltage is applied in one or more voltage pulses. Duration of each of the one or more pulses is for a duration period. The application of the voltage across the mixture decomposes and/or removes the pollutants from the contaminated soil to form remediated soil.

Implementations of the invention can include one or more of the following features:

The one or more pollutants can be selected from a group consisting of organic pollutants, metals, metalloids, heavy metals, toxic heavy metals, rare earth metals, main group metals, and transition metals.

The one or more pollutants can include one or more organic pollutants.

The voltage applied in the one more voltage pulses can decompose at least one of the one or more organic pollutants.

The at least one of the one or more organic pollutants can decompose by at least one of graphitization and graphene formation.

The at least one of the one or more organic pollutants can be converted to flash graphene by the application of the voltage.

The voltage applied in the one or more voltage pulses can remove at least one of the one or more organic pollutants.

The one or more organic pollutants can be removed by at least one of boiling, sublimation, and vaporization of the one or more organic pollutants.

The one or more organic pollutants can be organic pollutants selected from a group consisting of polycyclic aromatic hydrocarbons (PAH), polychlorinated biphenyl (PCB), organochlorine pesticides (OCP), halogenated flame retardants, hydrocarbons, halogenated organic compounds, halogenated aromatics, total petroleum hydrocarbons (TPH), and per- and polyfluoroalkyl substances (PFAS).

The one or more organic pollutants can include one or more polycyclic aromatic hydrocarbons (PAH).

The one or more polycyclic aromatic hydrocarbons (PAH) can be selected from a group consisting of pyrene, fluorene, and benz[a]anthracene.

The one or more organic pollutants can include one or more per- and polyfluoroalkyl substances (PFAS).

The one or more per- and polyfluoroalkyl substances (PFAS) can be selected from a group consisting of perfluorosulfonic acids and perfluorocarboxylic acids.

The one or more per- and polyfluoroalkyl substances (PFAS) can be selected from a group consisting of perfluorooctanesulfonic acid (PFOS) and perfluorooctanoic acid (PFOA).

The the one or more pollutants can include one or more metal pollutants. The one or more metal pollutants can be selected from a group consisting of metals, metalloids, heavy metals, toxic heavy metals, rare earth metals, main group metals, and transition metals.

The voltage applied in the one or more voltage pulses can remove the one or more metal pollutants from the contaminated soil.

The one or more metal pollutants can be removed by at least one of boiling, sublimation, and vaporization of the one or more metal pollutant.

The one or more metal pollutants can be evaporated by the application of the voltage.

The one or more metal pollutants can include one or more heavy metals.

The voltage applied in the one or more voltage pulses can remove the one or more heavy metals from the contaminated soil.

The one or more heavy metals can be removed by at least one of boiling, sublimation, and vaporization of the one or more metal pollutants.

The one or more heavy metals can be heavy metals selected from a group consisting of lead (Pd), arsenic (As), zinc (Zn), cobalt (Co), cadmium (Cd), copper (Cu), mercury (Hg), and nickel (Ni).

The one or more heavy metals can be heavy metals selected from a group consisting of lead (Pd), cobalt (Co), cadmium (Cd), copper (Cu), mercury (Hg), and nickel (Ni).

The one or more pollutants can include one or more organic pollutants and one or more metal pollutants. The one or more metal pollutants can be selected from a group consisting of metals, metalloids, heavy metals, toxic heavy metals, rare earth metals, main group metals, and transition metals.

The voltage applied in one more voltage pulses can decompose at least one of the one or more organic pollutants while simultaneously removing at least one of the one or more metal pollutants from the contaminated soil.

The duration period of each of the one or more voltage pulses can be between 1 microsecond and 20 seconds.

The conductive additive can include a carbon source.

The carbon source can be selected from a group consisting of elemental carbon, carbon black, graphene, turbostratic graphene, flash graphene, coal, anthracite, coke, metallurgical coke, calcined coke, activated charcoal, biochar, natural gas carbon that had been stripped of its hydrogen atoms, activated charcoal, shungite, plastic waste, plastic waste-derived carbon char, food waste, food waste-derived carbon char, biomass, biomass-derived carbon char, hydrocarbon gas, and mixtures therefrom.

The carbon source can be carbon black.

The carbon source can be predominately elemental carbon.

The conductive additive can include an additive selected from a group consisting of metallic phase of silicon, semi-metallic phase of silicon, calcium metal, iron metal, and conductive iron oxide particles.

At least 40% of the one or more pollutants in the contaminated soil can be decomposed and/or removed by the method.

Between 40% and 90% of the one or more pollutants in the contaminated soil can be decomposed and/or removed by the method.

The contaminated soil and the conductive additive can be mixed at a ratio in a range of 1:10 and 100:1.

The voltage applied can be in a range of 10 V and 400,000 V.

The mixture can have a resistance in the range of 0.1 ohms and 100 ohms when the voltage is applied.

The mixture can have a resistance in the range of 0.1 ohms and 10 ohm when the voltage is applied.

The voltage pulse can be performed using direct current (DC).

The method can be performed utilizing a pulsed direct current (PDC) Joule heating process.

The voltage pulse can be performed using alternating current (AC).

The voltage pulse can be performed by using both direct current (DC) and alternating current (AC).

The method can switch back and forth between the use of direct current (DC) and alternating current (AC).

The method can concurrently use direct current (DC) and alternating current (AC).

The one or more voltage pulses can increase the temperature of the mixture to at least 1000 K.

The one or more voltage pulses can increase the temperature of the mixture to at least 1500 K.

The one or more voltage pulses can increase the temperature of the mixture to at least 2000 K.

The one or more voltage pulses can increase the temperature of the mixture to at least 2500 K.

The one or more voltage pulses can increase the temperature of the mixture to at least 3000 K.

The method can be performed in a continuous process.

The continuous process can include loading the mixture into a cell. The continuous process can further include compressing the mixture within the cell. The continuous process can further include applying the voltage across the mixture within the cell. The continuous process can further include unloading the remediated soil from the cell.

The cell can be moved by a belt roller.

The method can be performed in a belt-fed process.

The method can be performed in an autonomous process.

In general, in another embodiment, the invention features a system for performing the method of soil remediation utilizing at least one of the above-described methods of soil remediation. The system includes a source of the mixture including the contaminated soil and the conductive additive. The system further includes a cell operably connected to the source such that the mixture can be flowed into the cell and held under compression. The system further includes electrodes operatively connected to the cell containing the mixture. The system further includes a flash power supply for applying a voltage across the mixture in the cell to form the remediated soil from the mixture.

Implementations of the invention can include one or more of the following features:

The system can be operable to perform a continuous process.

The cell can be movable.

The system can further include a bell roller operable for moving the cell.

The system can further include a reservoir for collecting the remediated soil.

The system can be operable to perform a belt-fed process.

The system can be operable to perform an autonomous process.

BRIEF DESCRIPTION OF THE DRAWINGS

FIG. 1A is an electrical diagram of the FJH system. FIG. 1B is a photograph of the FJH system. FIG. 1C is a photograph of the FJH reaction stage for small samples. FIG. 1D is a photograph of the FJH mild vacuum chamber. FIG. 1E is a photograph of the FJH reaction stage for large samples.

FIG. 3A shows a scheme of the FJH system. The two graphite electrodes are loosely fit into the quartz tube to permit outgassing. FIG. 3B shows a schematic showing the removal of heavy metals by vaporization, and the decomposition and graphitization of organic pollutants.

FIG. 3C shows current curve at FJH condition of 100 V and 1 s. FIG. 3D shows real-time temperature curves at FJH voltages of 80 V and 100 V, respectively. FIG. 3E shows vapor pressure-temperature relationships of representative heavy metals and carbon.

FIG. 4A shows the heavy metal contents in clean soil. FIG. 4B shows the heavy metals contents in CB. The error bars denote the standard deviation where n=3. The concentration of 0 denotes not detectable by ICP-OES.

FIG. 5A shows the concentration of heavy metals in c-Soil. FIG. 5B shows the removal efficiencies of representative heavy metals varied with FJH voltages. FIG. 5C shows the removal efficiencies of heavy metals at FJH voltage of 100 V. (The error bars in FIGS. 5A and 5C denote the standard deviation where n=3.) FIG. 5D shows XPS fine spectra of c-Soil and remediated soil (r-Soil)

for Ni (left) and Cu (right). FIG. 5E shows XRD patterns of c-Soil and r-Soil. FIG. 5F is an SEM image of the r-Soil.

FIG. 6A shows heavy metal contents in metallurgical coke (Metcoke). FIG. 6B shows heavy metal removal efficiencies of the contaminated soil by using Metcoke as the conductive additives. FIG. 6C shows heavy metal contents in flash graphene (FG) derived from Metcoke. FIG. 6D shows heavy metal removal efficiencies of the contaminated soil by using FG as the conductive additives. The error bars denote the standard deviation where n=3.

FIG. 7A is an SEM image of the clean soil. FIG. 7B is an SEM image of the mixture of c-Soil and carbon black.

FIG. 9A is XPS fine spectrum of Cu. FIG. 9B is XPS fine spectrum of Ni.

FIG. 10A is the calibration curve of pyrene. FIG. 10B is the calibration curve of fluorene. FIG. 10C is the calibration curve of benz[a]anthracene.

FIG. 11A is UV absorption spectra of raw pyrene contaminated soil and the c-Soil after repetitive FJH pulses. (Inset is the chemical structure of pyrene.) FIG. 11B shows the content of pyrene in soil with repetitive FJH pulses. FIG. 11C is UV absorption spectra of raw fluorene contaminated soil and the c-Soil after repetitive FJH pulses. (Inset is the chemical structure of fluorine.) FIG. 11D shows the contents of fluorene in soil with repetitive FJH pulses. FIG. 11E is UV absorption spectra of raw benz[a]anthracene contaminated soil and the c-Soil after repetitive FJH pulses. (Inset is the chemical structure of benz[a]anthracene.) FIG. 11F shows the contents of benz[a]anthracene in soil varied with repetitive FJH pulses. The safe contents denote the preliminary remediation goals. [Guo 2020]. The error bars in FIGS. 11B, 11D, and 11F denote the standard deviation where n=3.

FIG. 12A is Raman spectra of the mixture of pyrene, soil, and carbon black before and after FJH. FIG. 12B is Raman spectra of the mixture of fluorene, soil, and carbon black before and after FJH. FIG. 12C is Raman spectra of the mixture of benz[a] anthracene, soil, and carbon black before and after FJH.

FIG. 13A is a photograph of the large-scale FJH equipment with $C_1$=0.624 F filing a 5 ft-wide hood. FIG. 13B is a photograph of the FJH samples with mass of $m_0$=0.2 g (left) and $m_1$=2.0 g (right). FIG. 13C shows a real-time temperature curve of the sample with mass of $m_1$=2.0 g with the condition of $C_1$=0.624 F and $V_1$=120 V. FIG. 13D shows removal efficiencies of representative heavy metals after one-time FJH. The error bars denote the standard deviation where n=3. FIG. 13E is a schematic of a continuous FJH using a belt roller for soil remediation.

FIG. 14A is a schematic of the AC-FJH system. Two circuit breakers (maximum current of 10 A) were used. FIG. 14B is a photograph of the AC-FJH system. FIG. 14C shows removal efficiency of heavy metals by AC-FJH.

DETAILED DESCRIPTION

Figure 1A:
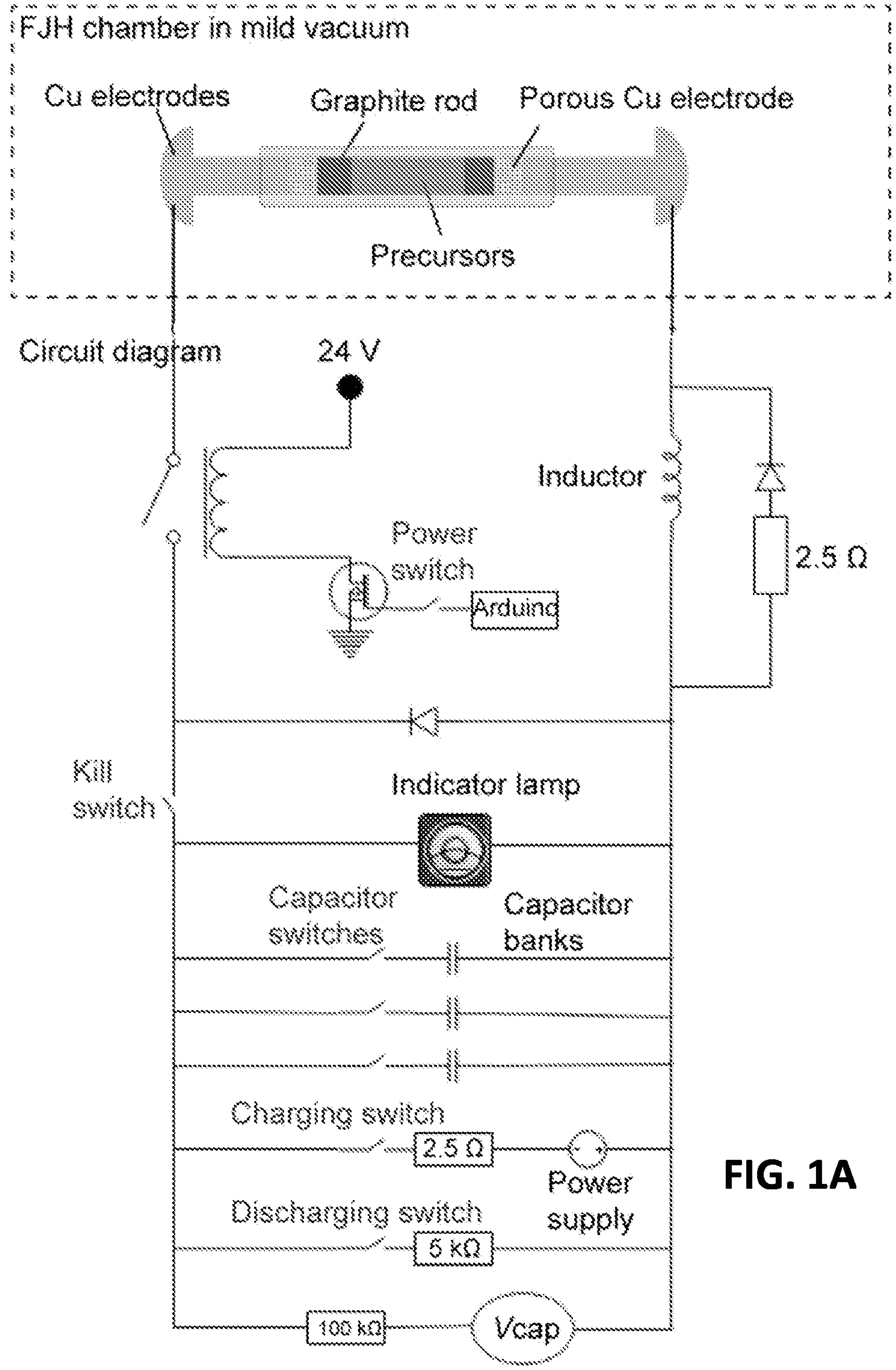
FIG. 1A-1E shows an electrical diagram and setup of the flash Joule heating (FJH) system.

The present invention relates to ultrafast flash Joule heating synthesis methods and systems, and more particularly, methods and systems for soil remediation by flash Joule heating.

Direct electrical heating is emerging as a highly energy-efficient high-temperature technique for materials synthesis [Yao 2018; Liu 2022; Liu C 2020; Liu S 2020], processing [Wang 2020; Cheng 2022], and waste management [Barbhuiya 2021]. The inventors of the present invention have developed flash Joule heating (FJH) processes for converting carbon-containing sources into high-quality graphene. [Luong 2020]. In addition to the materials synthesis capability [Deng I 2022; and Chen I 2021], it has been demonstrated that the FJH process can be used for sustainable management of plastic [Algozeeb 2020; Wyss 2021] and rubber wastes [Advincula 2021], and the recovery of critical metals from industrial wastes [Deng 2021; Deng II 2022]. [See also Tour PCT '000 Application; Tour PCT September 2021 Applications].

It has now been discovered by the inventors and Applicant that FJH can be utilized as a rapid and broad-based process for the effective removal of pollutants in contaminated soil. I.e., rapid and general FJH processes have been discovered by inventors and Applicant for the effective removal of contaminants in soil regardless of the chemical forms and speciation. The concentrations of toxic heavy metals in contaminated soil, including Cd, Hg, Pb, Co, Ni, and Cu, are reduced by FJH to within the government-set safe limits; the organic contaminants are removed by graphitization to a nontoxic carbon form, as demonstrated by the greatly reduced concentrations of PAHs in the contaminated soil. The FJH is energy efficient due to the rapid heating and cooling rate and short duration with an estimated cost of ~$8 $ton^{-1}$ for soil remediation, which is 12% to 25% of the cost of other state-of-the-art innovative technologies. The FJH process, with the benefits of versatility, ultrafast speed, low cost, no water use, and good scalability, would be a harbinger for near-future soil remediation practice.

For example, in embodiments of the FJH process, such as shown in FIGS. 1A-1E, the soil sample temperature could be risen at ~$10^5$° C. $s^{-1}$ to >3000° C. within 1 s by a pulsed direct current (DC) input and then rapidly cooled at ~$10^4$° C. $s^{-1}$. Unlike furnace treatment, FJH directed most of its energy to the sample and not the containment vessel, so the energy input is low, and the cooling is very rapid. Under such a high temperature, the toxic heavy metals including Cd, Hg, Pb, Co, Ni, and Cu can be removed to within the regulation levels by evaporative loss, and organic pollutants like PAHs are graphitized, thereby being stable and nontoxic. The FJH is highly energy efficient (such as presently with a cost of ~$8 $ton^{-1}$ in electrical energy), which is 12% to 25% the cost of other present state-of-the-art technologies. The FJH process can also be up-scaled for industrialization.

System and Process

Figure 2:
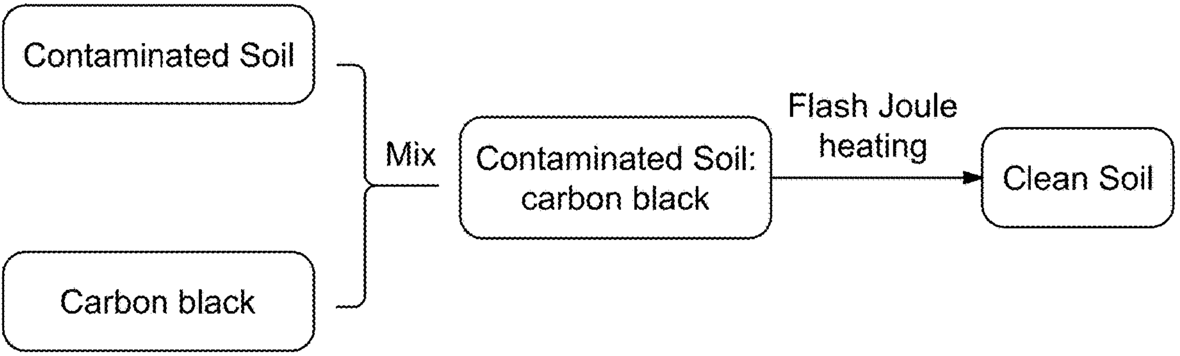
FIG. 2 illustrates a process of the soil remediation by flash Joule heating.

A general overall process for the soil remediation by flash Joule heating is shown in FIG. 2. As shown in FIG. 2, a contaminated soil (c-Soil) that includes organic pollutants and/or one or more toxic heavy metals is mixed with carbon black (or other conductive additive that is a carbon source) to form a mixture. The mixture then undergoes flash Joule heating to clean the soil (by the decomposing of the organic pollutants and/or removing of the one or more toxic metals).

Figure 1B:
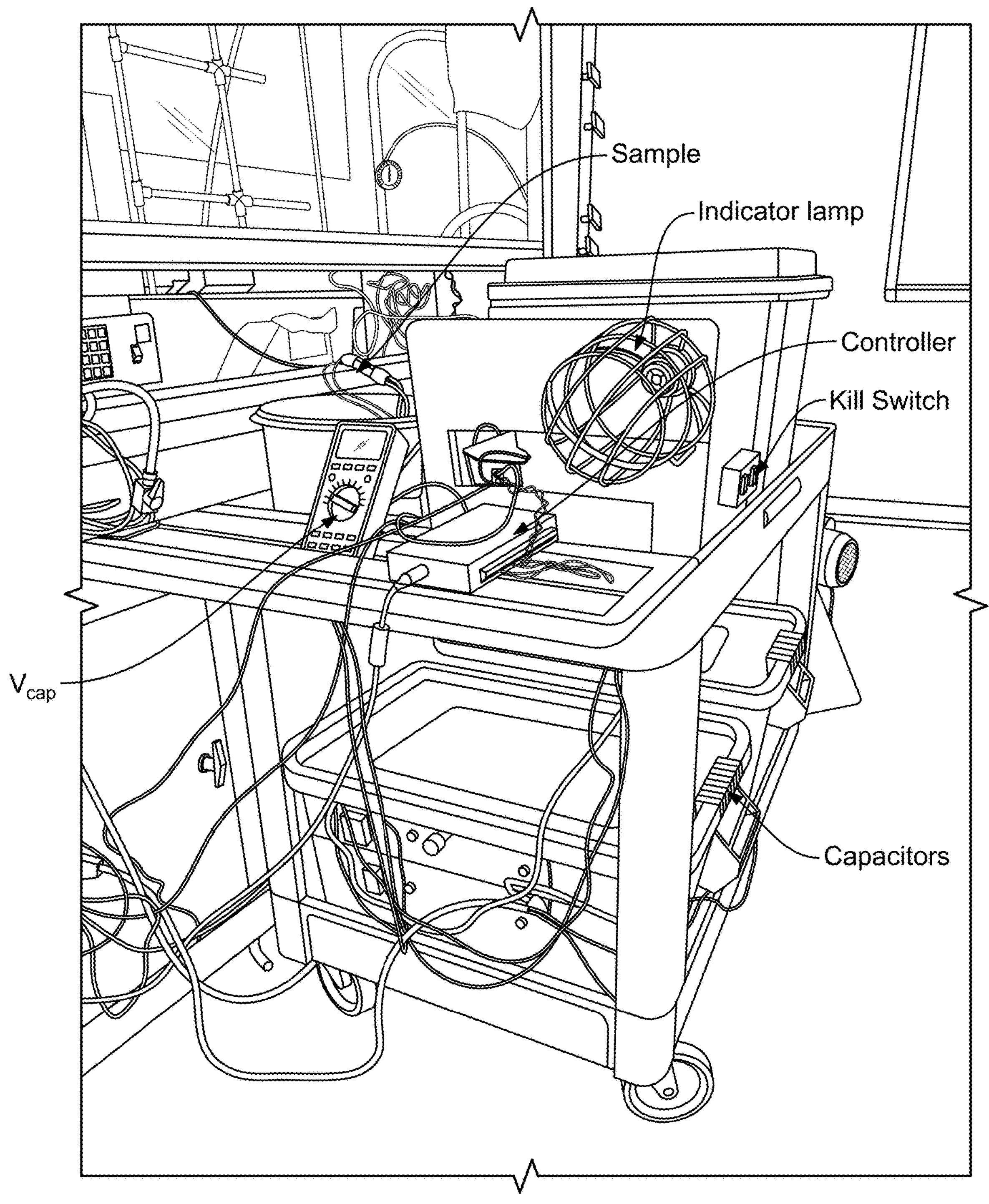
Figure 1C:
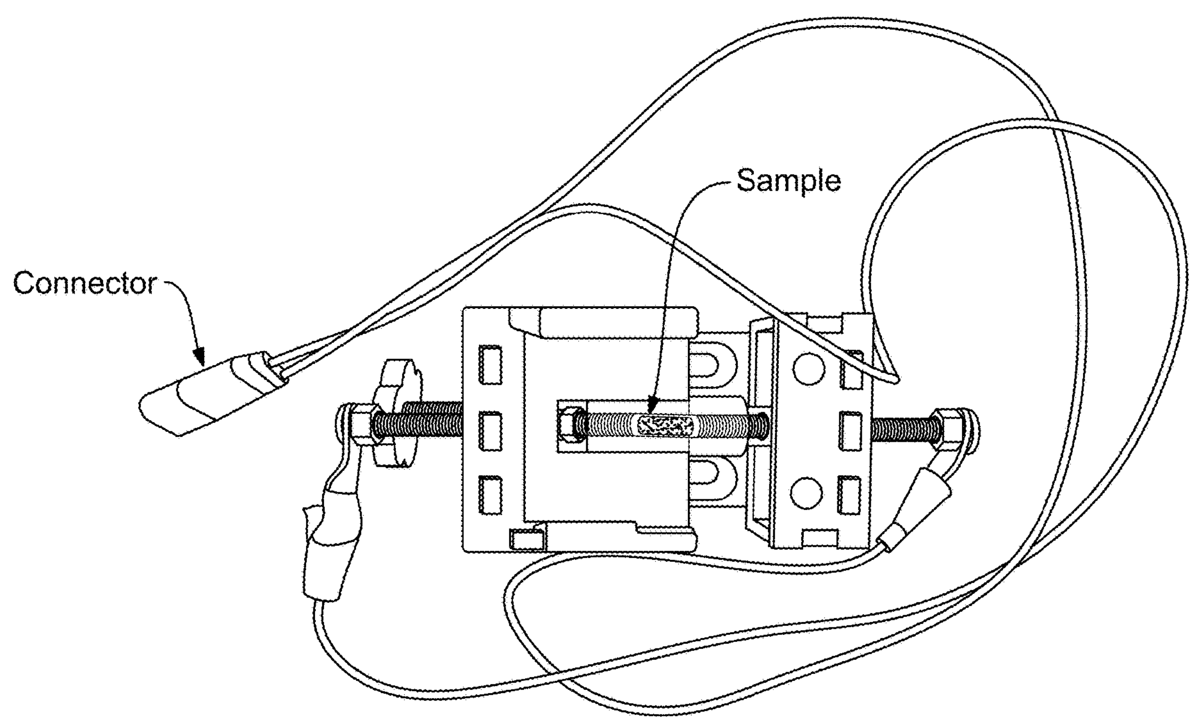
Figure 1D:
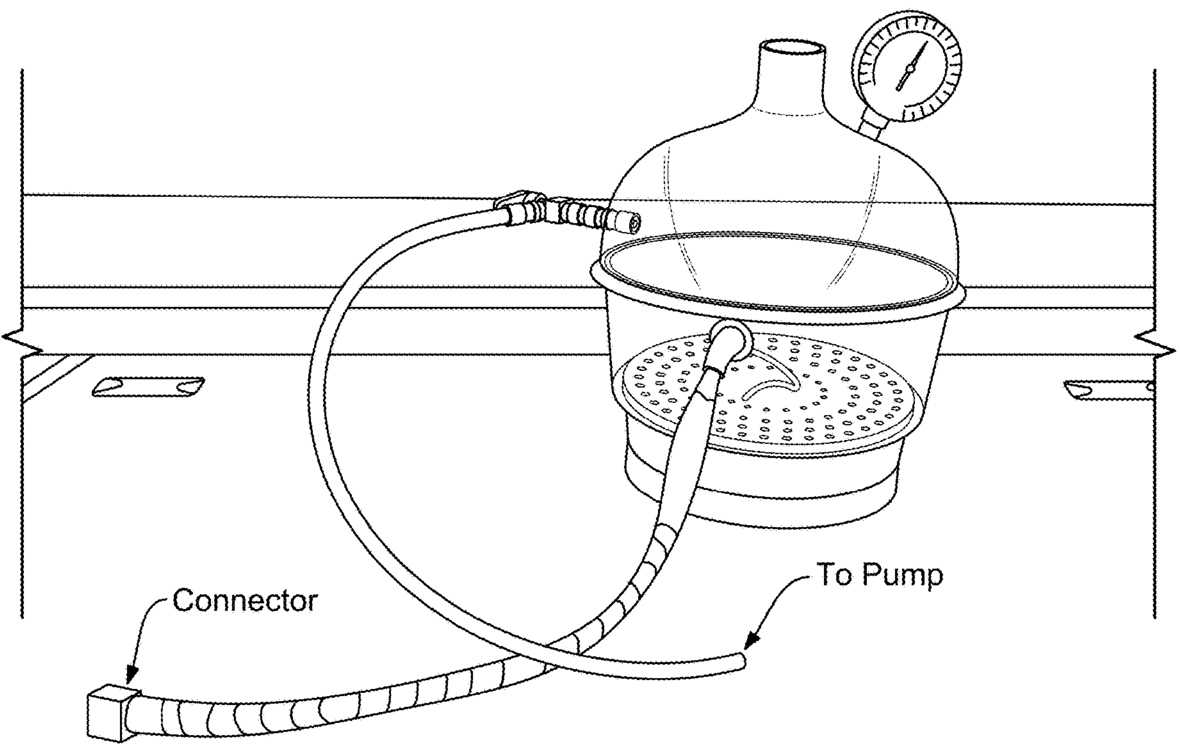
Figure 1E:
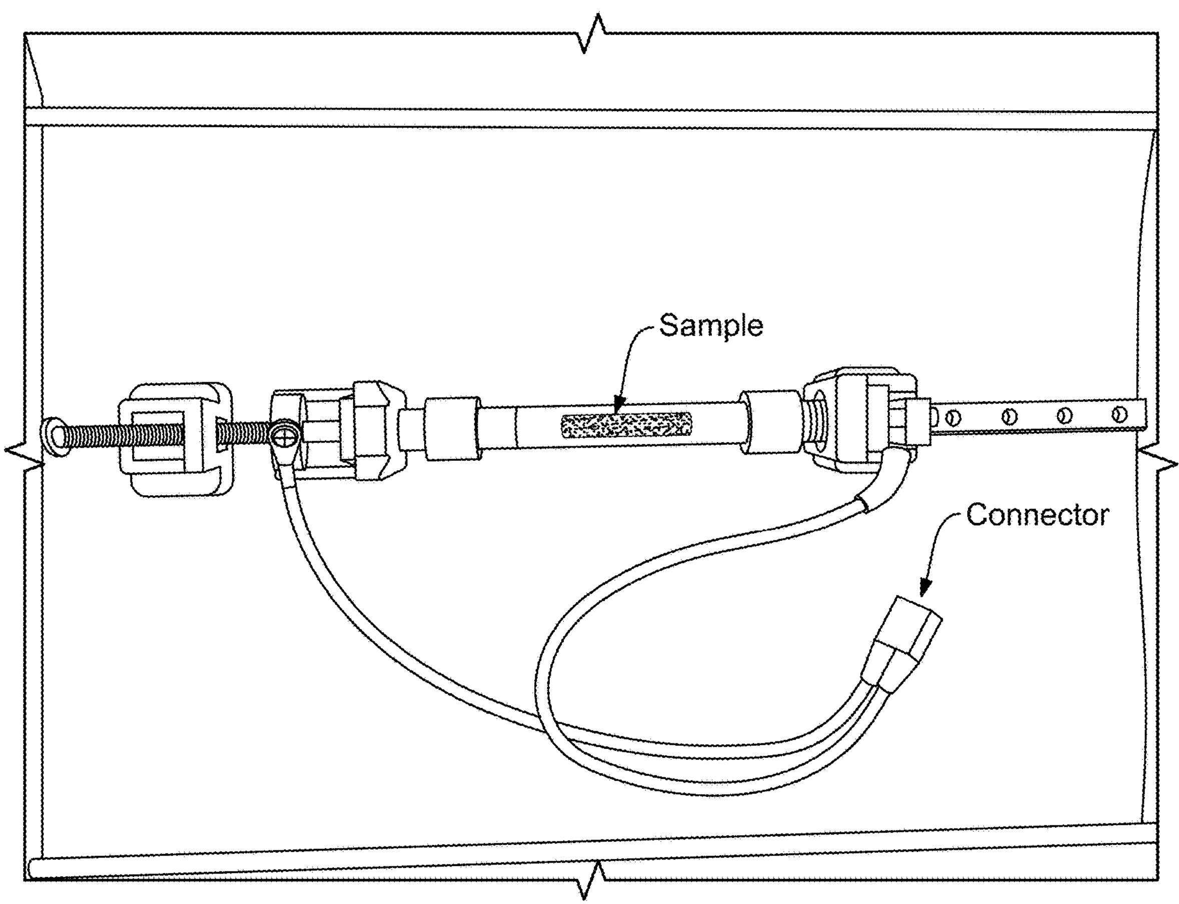

An exemplary system and process used to perform this method is shown in the electrical circuit diagram and setup of the FJH system depicted in FIGS. 1A-1E. The capacitor bank used for charging is composed of 10 aluminum capacitors (450 V, 6 mF, Mouser #80-PEH200YX460BQU2), with a total capacitance is 60 mF. Additional details of the electrical components are found in Luong 2020, as well as in Tour PCT '000 Application; Tour PCT September 2021 Applications. The FJH system had a quartz tube with inner diameter (ID) of 8 mm and outer diameter (OD) of 12 mm. Graphite rods were used as the electrodes in both sides of the quartz tube. (The graphite electrodes were loosely loaded in the quartz tube, and porous Cu electrodes are used to permit outgassing). The tube was then loaded on the reaction stage (FIG. 1C) and connected to the FJH system (FIG. 1B). The reaction stage was put into a desiccator with mild vacuum to facilitate degassing (FIG. 1D). The resistance was controlled by compressing the electrodes. A capacitor bank with a total capacitance of 60 mF was charged by a DC supply, which can reach a voltage up to 450 V. A relay with programmable ms-level delay time was used to control the discharge time. The discharging of the capacitor can bring the sample to a high temperature.

Figure 3A:
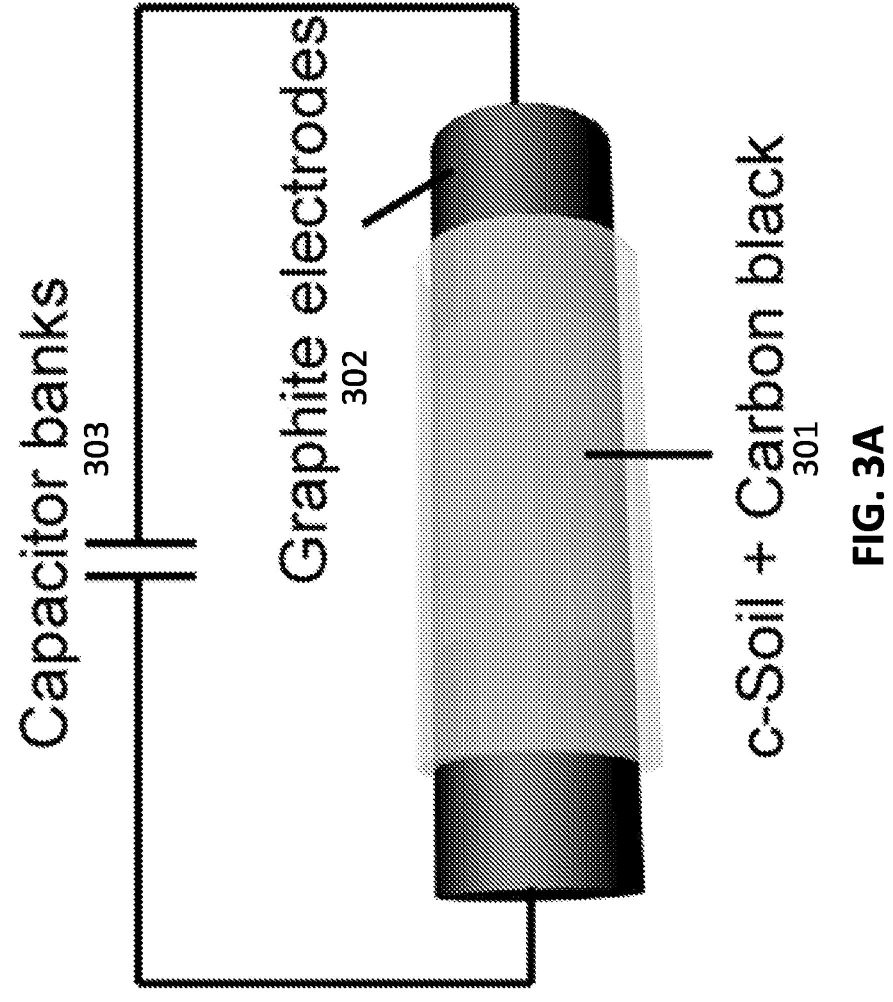
FIGS. 3A-3E show soil remediation by flash Joule heating (c-Soil is contaminated soil).

In a soil remediation by flash Joule heating process utilizing the FJH system depicted in FIGS. 1A-1E, contaminated soil (c-Soil) was mixed with carbon black (CB, ~30 wt %), which served as the conductive additive. Other conductive additives that are a carbon source can alternatively be utilized such as metallurgical coke, anthracite, calcined coke, coal, petroleum coke, and flash graphene. The mixture of c-Soil and CB (mixture 301) was loaded into a quartz tube (FIG. 3A). Two graphite electrodes 302 were used and loosely fit in the quartz tube to permit outgassing and to avoid contamination from the metal electrodes during the FJH reaction. The resistance of the sample was controlled by compressing the graphite electrodes, which were connected to a capacitor bank 303 with total capacitance of C=60 mF. See FIGS. 1A-1C.

Figure 3B:
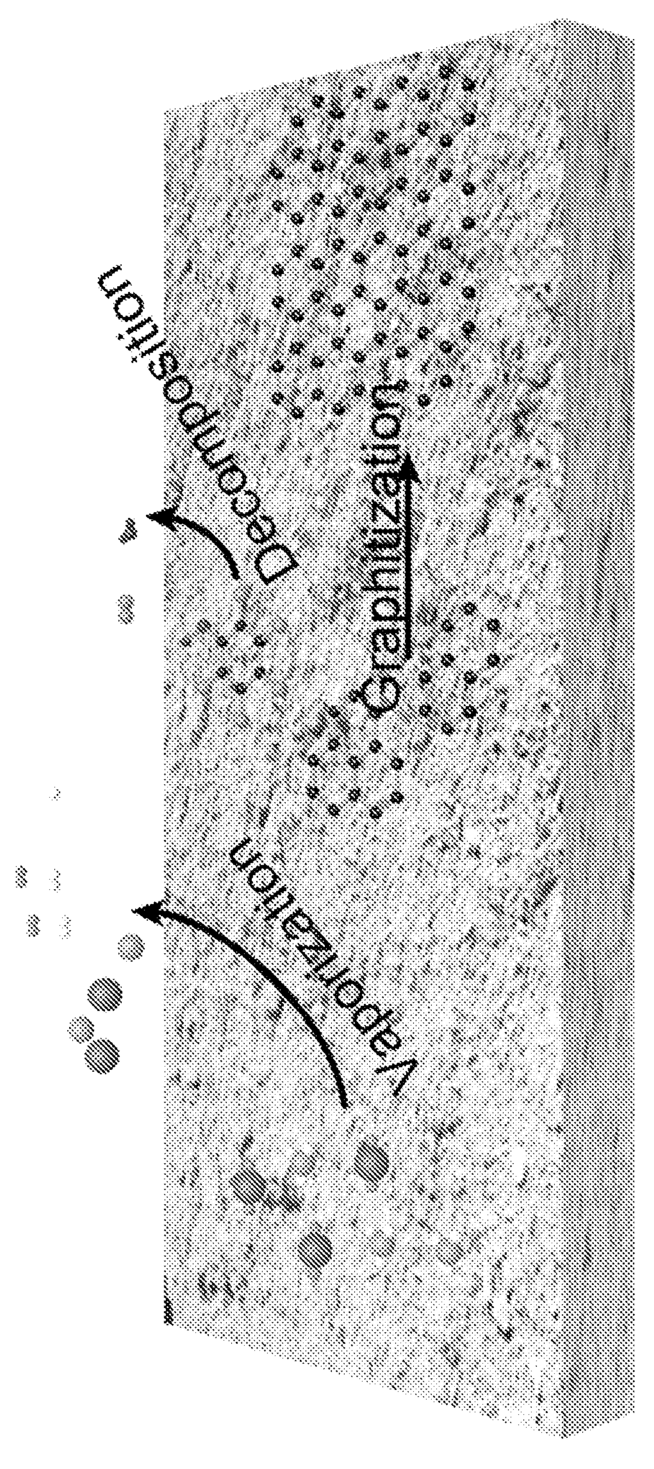

The FJH process was conducted in a mild vacuum (~10 mm Hg) chamber; a vacuum desiccator (FIG. 1D). The discharging of the capacitor bank brought the sample to a very high temperature. Under the ultrahigh temperature, most of the heavy metals, including Cd, Hg, Pb, Co, Cu, and Ni, could be vaporized regardless of their chemical forms being metal salt or elemental metal (see TABLE I), and the organic compounds could be carbonized to their most stable form of carbon, graphene agglomerate or graphite, which is a naturally occurring mineral and nontoxic [Starý 2003]. See FIG. 3B.

TABLE I

Physical properties of the precursors and corresponding metals

| Precursors | Decomposition temperature (° C.) | Metal | Melting point (° C.) | Boiling point (° C.) |
|---|---|---|---|---|
| $CdCl_2$ | 961 | Cd | 321 | 767 |
| $HgCl_2$ | 138 | Hg | −38.8 | 357 |
| $Pb(NO_3)_2$ | 200-470 | Pb | 327 | 1749 |
| $CoCl_2$ | >873 | Co | 1495 | 2927 |
| $CuCl_2$ | 993 | Cu | 1085 | 2562 |
| $NiCl_2$ | >800 | Ni | 1455 | 2913 |

In a typical experiment, a FJH voltage of V=100 V, discharging time of t=1 s, and sample resistance of R=1Ω were used. See TABLE II.

TABLE II

Parameters for FJH

| Precursors | Mass Ratio | Mass (mg) | Res (Ω) | Volt (V) | T (s) | Mass after FJH (mg) |
|---|---|---|---|---|---|---|
| c-Soil(heavy metals):CB | 2:1 | 200 | 1.0 | 60 | 1 | 145 |
| c-Soil(heavy metals):CB | 2:1 | 200 | 1.0 | 80 | 1 | 105 |
| c-Soil(heavy metals):CB | 2:1 | 200 | 1.0 | 100 | 1 | 81 |
| c-Soil(heavy metals):Metcoke | 2:1 | 206 | 2.0 | 100 | 1 | 122 |
| c-Soil(heavy metals):FG | 2:1 | 211 | 1.5 | 100 | 1 | 135 |
| c-Soil(pyrene):CB | 2:1 | 200 | 0.8 | 100 | 1 | 129 |
| c-Soil(fluorene):CB | 2:1 | 200 | 0.8 | 100 | 1 | 135 |
| c-Soil(benz[a]anthracene):CB | 2:1 | 200 | 0.8 | 100 | 1 | 156 |

Figure 3D:
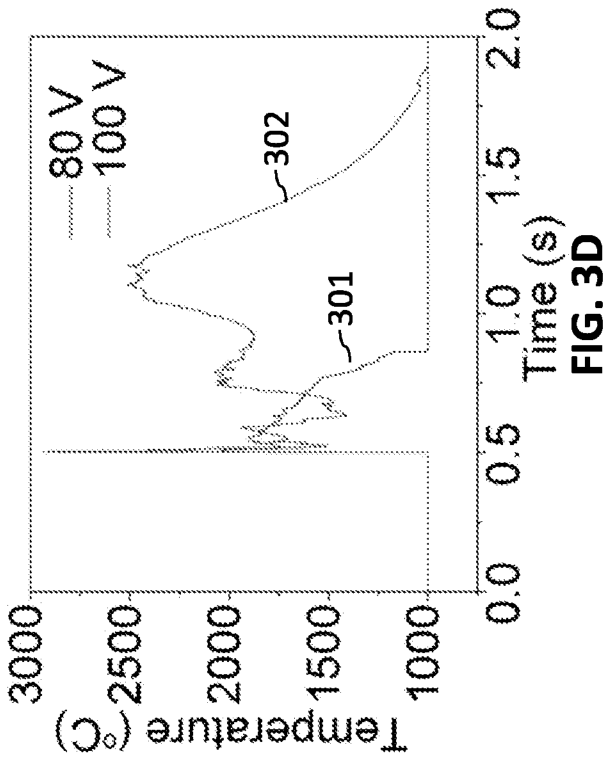
Figure 3C:
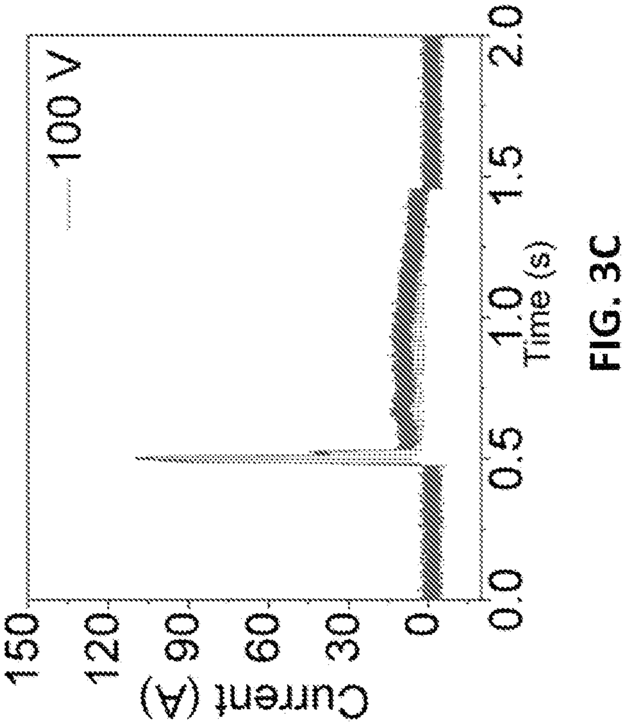
Figure 3E:
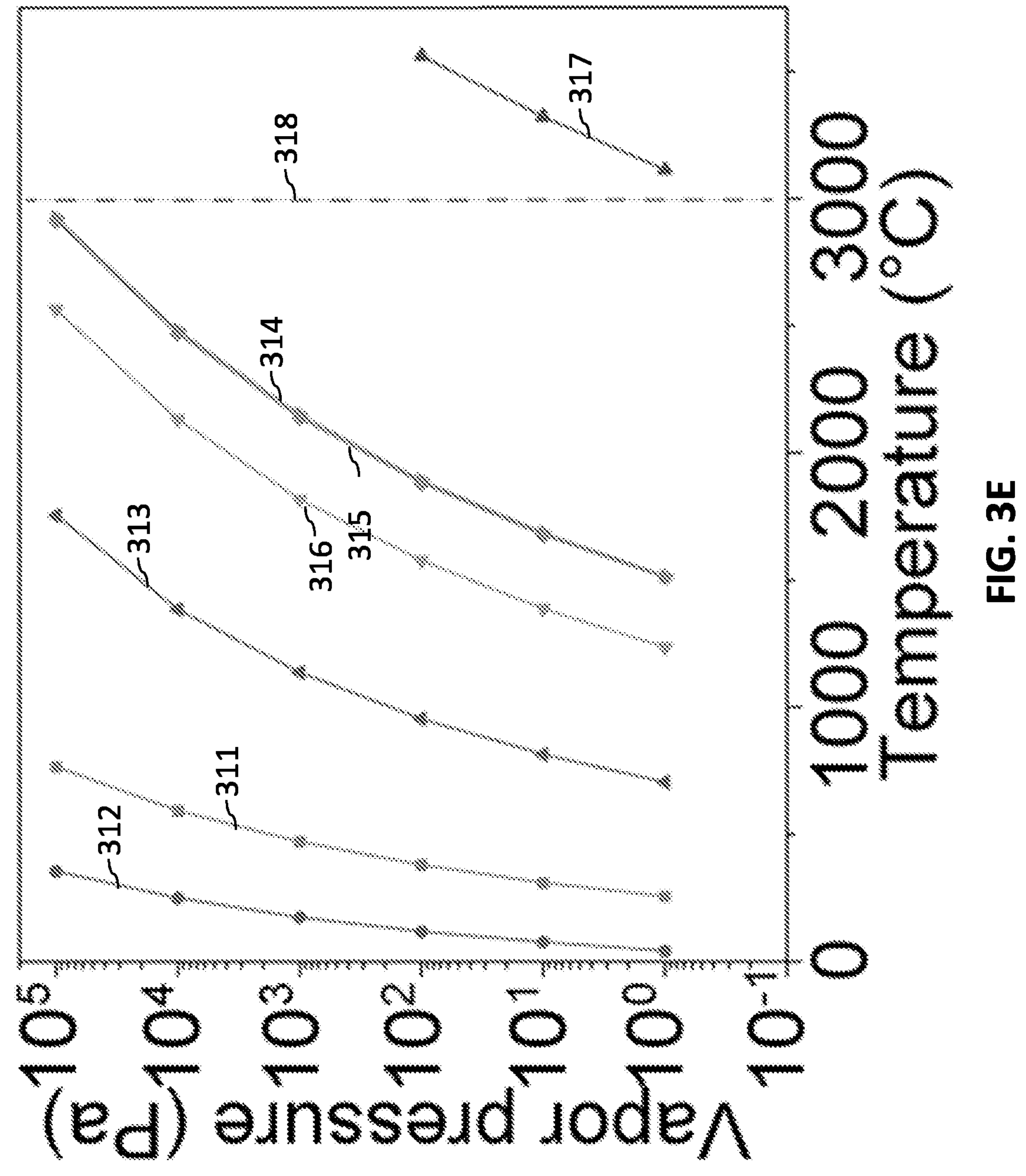

The current curve was recorded during the discharging, showing the maximum value of ~100 A (FIG. 3C). The real-time temperature was recorded using infrared thermometer (FIG. 3D, with curves 301-302 for 80V and 100 V, respectively). It is found that the temperature depends on the FJH voltages, with the maximum temperatures of ~3000° C. and ~2000° C. at FJH voltages of 100 V and 80 V, respectively. According to the relationship between vapor pressure and temperature of representative heavy metals Cd, Hg, Pb, Co, Ni, and Cu (curves 311-316) and carbon (curve 317) as shown in FIG. 3E (with dashed line 318 denoting the temperature of 3000° C.), the representative heavy metals all have high vapor pressure (>$10^5$ Pa) below 3000° C., indicating that the heavy metals can be efficiently evaporated during the FJH process.

Removal of Toxic Heavy Metals by Flash Joule Heating

Figure 4B:
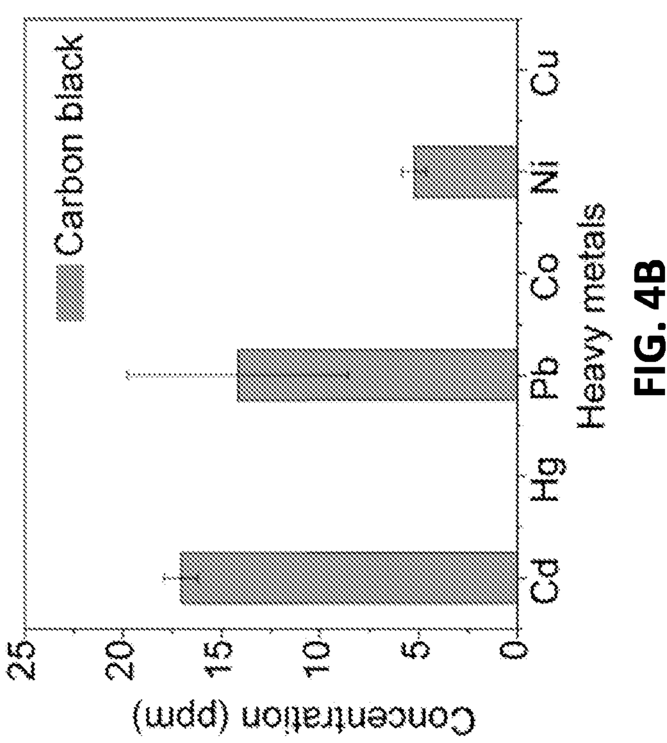
FIG. 4A-4B show heavy metal contents measurement in clean soil and CB.
Figure 4A:
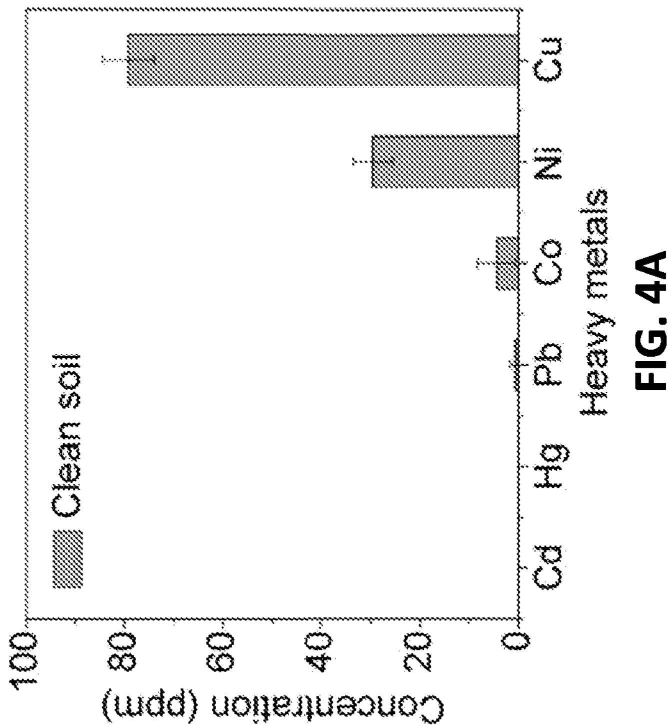

Clean soil was collected from the Rice University campus (FIG. 4A). Considering the disparate safety standards for different heavy metals [Cal OEHHA 2010], the clean soil sample was co-contaminated by simultaneously spiking with Cd (~100 part per million, ppm), Hg (~300 ppm), Pb (~1000 ppm), Co (~2000 ppm), Ni (~10000 ppm), and Cu (~10000 ppm). Specifically, the concentrations of heavy metals in clean soil are low (Cd undetectable, Hg undetectable, Pb~0.6 ppm, Co~4.5 ppm, Ni~30 ppm, and Cu~79 ppm), and hence the concentration of heavy metals in the contaminated soil were controlled by spiking with metal salts (Cd~100 ppm, Hg~300 ppm, Pb~1000 ppm, Co~2000 ppm, Ni~10000 ppm, and Cu~10000 ppm). As shown in FIG. 4B, the concentrations of heavy metals in carbon black (Cd~17 ppm, Hg undetectable, Pb~10 ppm, Co undetectable, Ni~6 ppm, and Cu undetectable) are far below that of the contaminated soil (Cd~100 ppm, Hg~300 ppm, Pb~1000 ppm, Co~2000 ppm, Ni~10000 ppm, and Cu~10000 ppm), and hence will not introduce significant error during the FJH process.

The concentrations of heavy metals in the c-Soil and the remediated soil (r-Soil) by FJH were measured by inductively coupled plasma optical emission spectrometry (ICP-OES) after digestion using the method from the standard from the Environmental Protection Agency (EPA), USA. [US EPA 1996]. For this digestion process, the samples (~50 mg) were added into $HNO_3$ (2 mL, 67-70 wt %, 1:1 with water) at 95° C. for 2 h. Then, $H_2O_2$(2 mL, 30 wt %, 1:1 with water) was added and heated to reflux at 95° C. for 2 h. Then, HCl (1 mL, 37 wt %) and $H_2O$ (5 mL) were added, and the mixture was heated at reflux for 15 min. The acidic solution was filtered to remove any undissolved particles using a sand core funnel (Class F). The filtrate was then diluted to the range within the calibration curve.

The removal efficiency (R) of heavy metals is calculated according to Equation (1), $$R = \frac{c(c-\text{Soil})\times m(c-\text{Soil}) - c(r-\text{Soil})\times m(r-\text{Soil})}{c(c-\text{Soil})\times m(c-\text{Soil})}\times 100\% \quad (1)$$

where m(c-Soil) is the mass of c-Soil used for FJH, c(c-Soil) is the concentration of heavy metals in c-Soil, m(r-Soil) is the mass of r-Soil after FJH, and c(r-Soil) is the concentration of heavy metals in r-Soil.

Figure 5A:
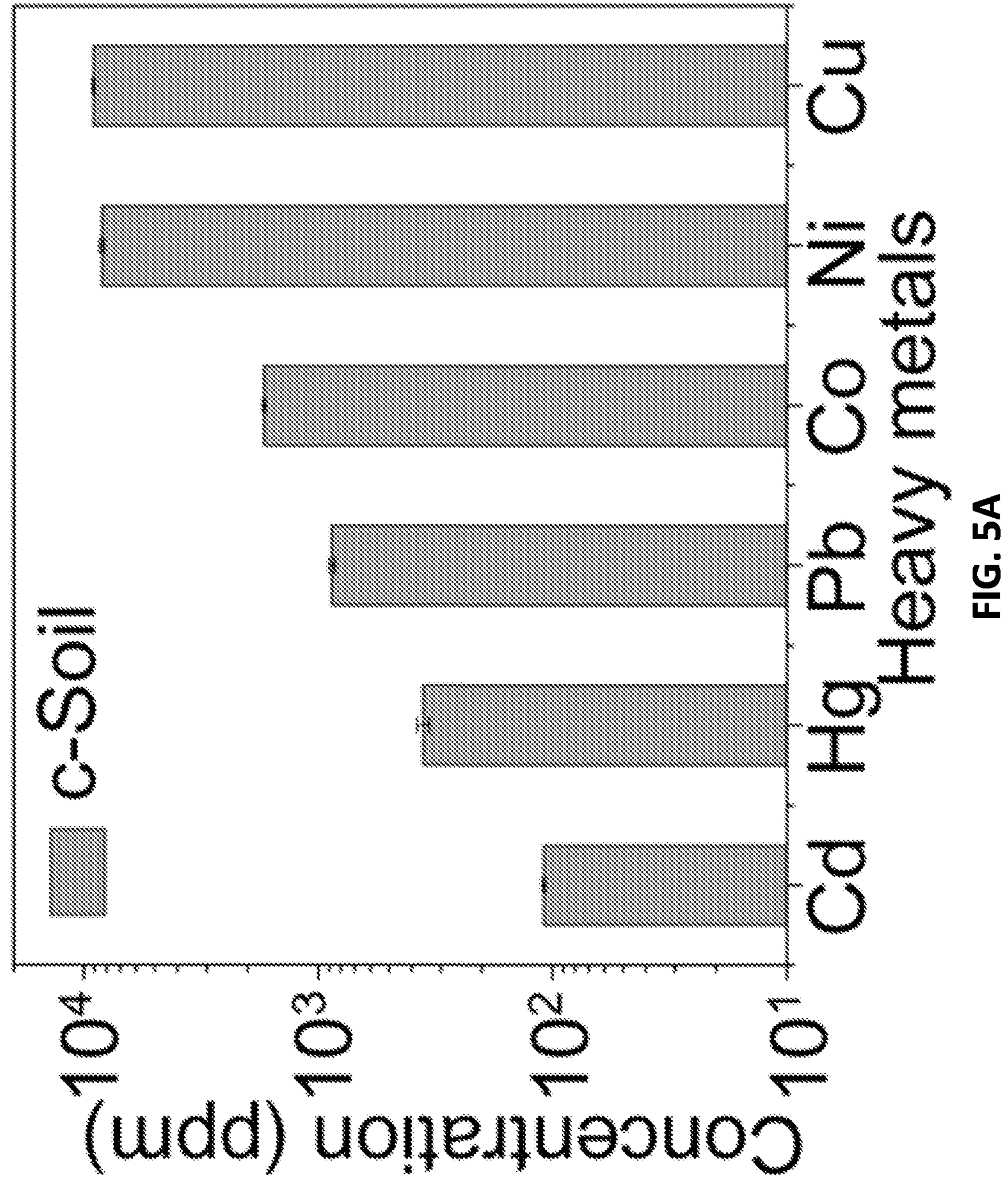
FIGS. 5A-5F show removal of toxic heavy metals in soil by flash Joule heating.
Figure 5B:
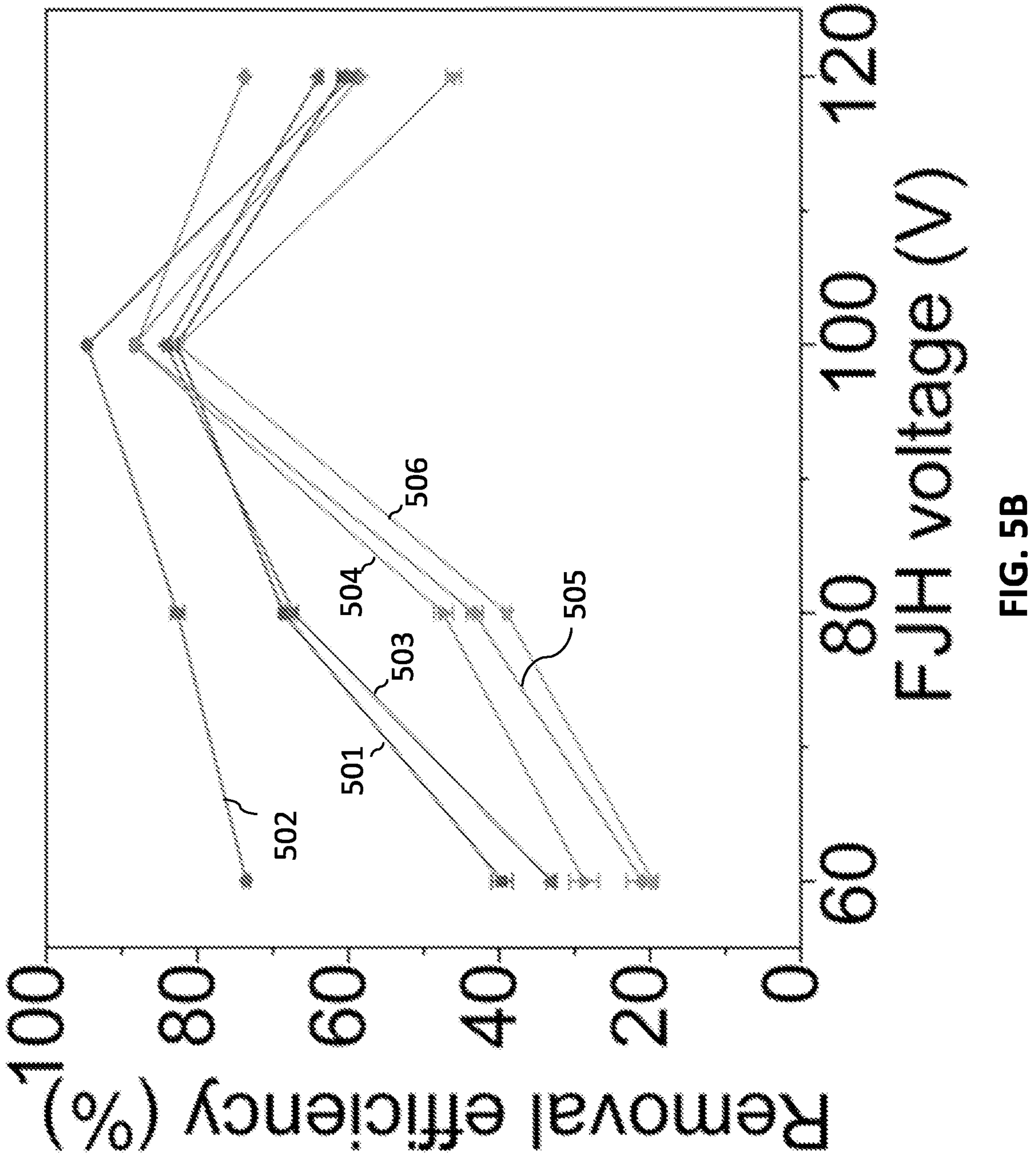

The removal efficiencies of heavy metals were investigated at different FJH voltages. As shown in FIG. 5B (curves 501-506 for Cd, Hg, Pb, Co, Ni, and Cu, respectively), the removal efficiencies of the heavy metals depended on the FJH voltage. It was discovered that the removal efficiencies improved from 60 V to 100 V; this is reasonable since a higher voltage leads to higher temperature (FIG. 3D), and, hence, better evaporative removal of heavy metals. However, an even higher voltage might lead to inhomogeneous Joule heating and hence the removal efficiencies were reduced.

At the FJH voltage of 100 V, the removal efficiencies of all the heavy metals are >80% in a single FJH pulse (FIG. 5C), indicating the efficient removal of heavy metals. It is noteworthy that the concentrations of heavy metals in CB are far below those in c-Soil (FIG. 4B), and, hence, the use of CB as conductive additives will not introduce significant error. In addition to CB, other inexpensive carbon sources with adequate conductivities could also be used as the conductive additives.

For example, the efficiency of metallurgical coke (Metcoke) or flash graphene as the conductive additives has been demonstrated. See FIGS. 6A-6D.

Figure 5C:
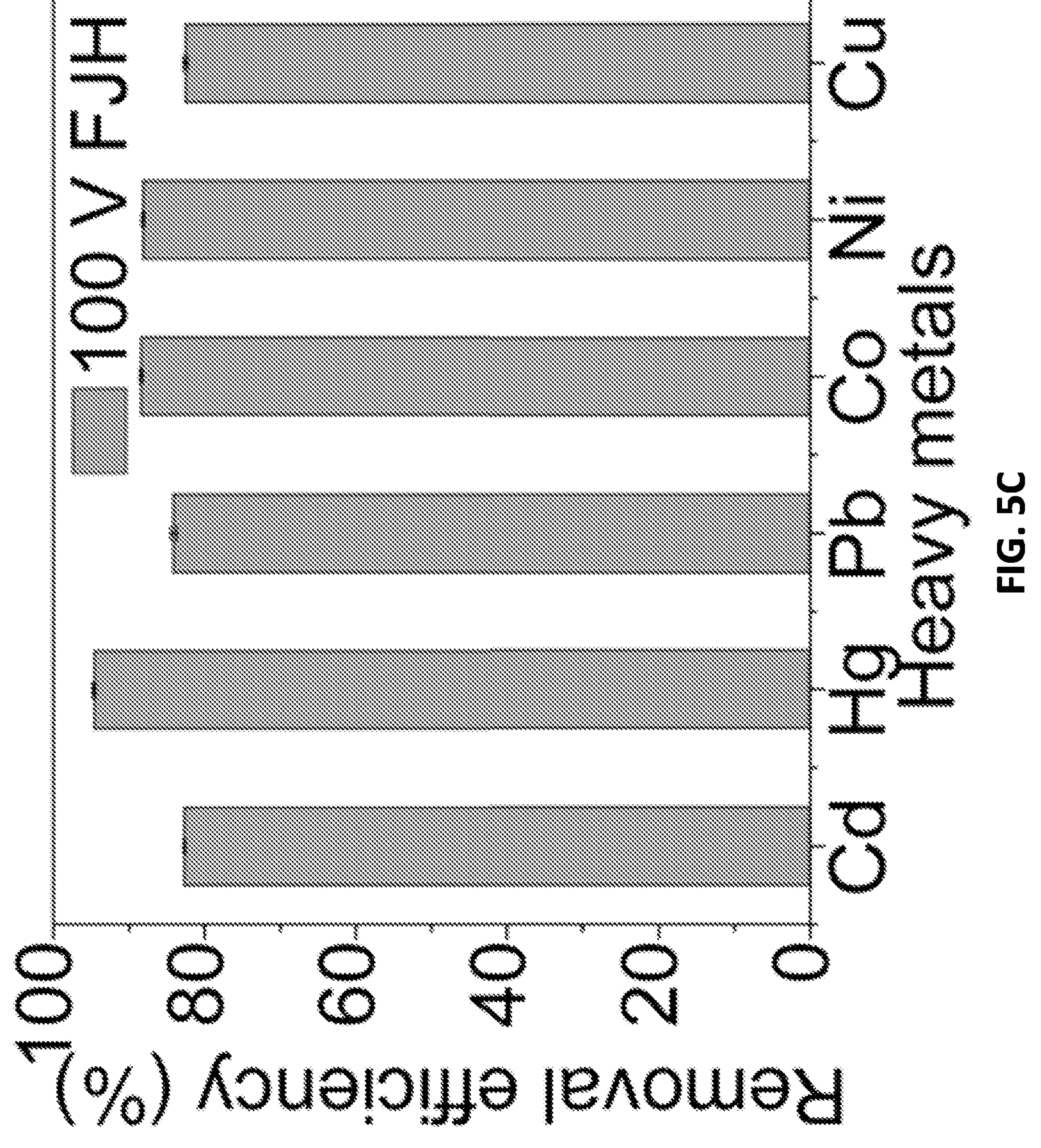
Figure 6B:
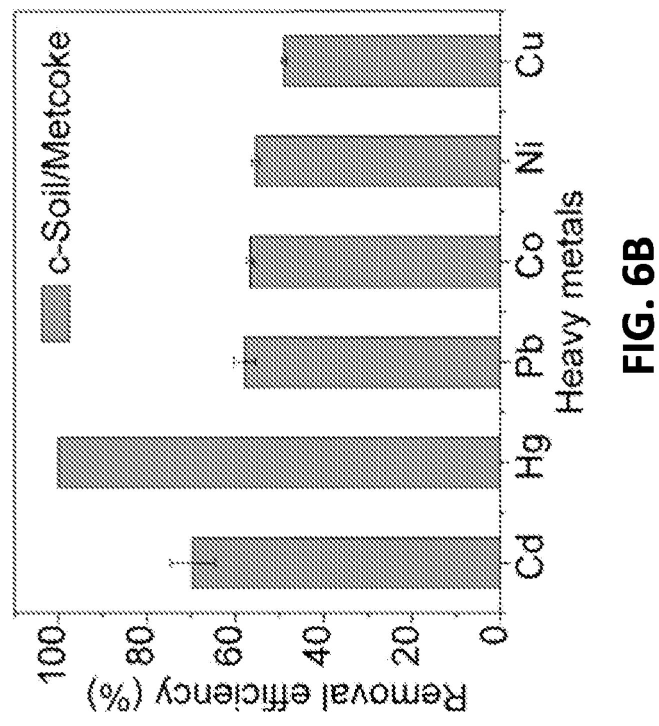
FIGS. 6A-6D show heavy metals removal using inexpensive carbon source additives.
Figure 6A:
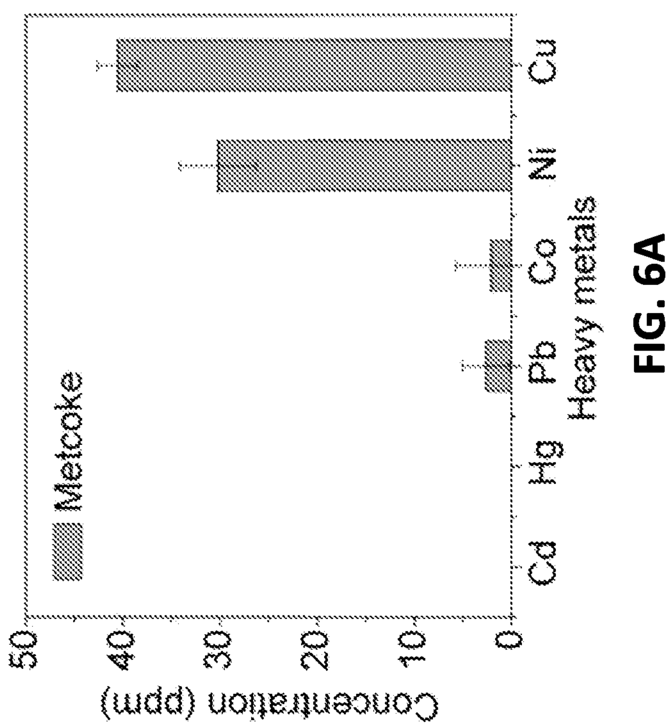
Figure 6D:
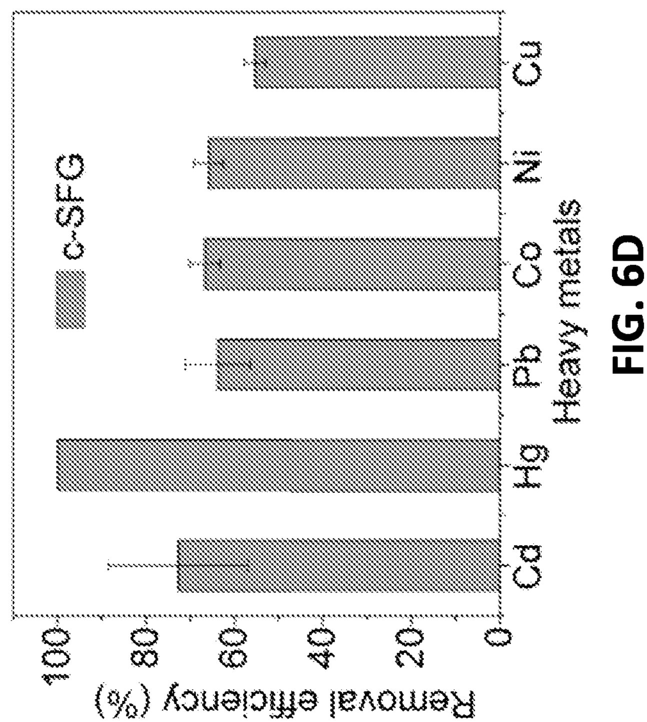

The concentrations of heavy metals in Metcoke are Cd undetectable, Hg undetectable, Pb~2.7 ppm, Co~2.1 ppm, Ni~30 ppm, and Cu~41 ppm. FIG. 6A. These values are far below that of the contaminated soil (Cd~100 ppm, Hg~200 ppm, Pb~1000 ppm, Co~200 ppm, Ni~10000 ppm, and Cu~10000 ppm, FIG. 5A), and hence did not introduce significant error during the FJH process. The removal efficiencies of heavy metals are ~60% for most of the metals (FIG. 6B), which is somewhat less than that by using carbon black as the additive. FIG. 5C. It is believed that the reason might be that the carbon black has a higher conductivity than the Metcoke and thus has relatively better removal efficiencies (R~1.0Ω for CB as additive, and R~2.0Ω for Metcoke as additive). Moreover, carbon black has a much smaller particle size and much higher surface area than Metcoke; hence, the use of carbon black as the conductive additive could presumably provide a better homogeneous heating.

Figure 6C:
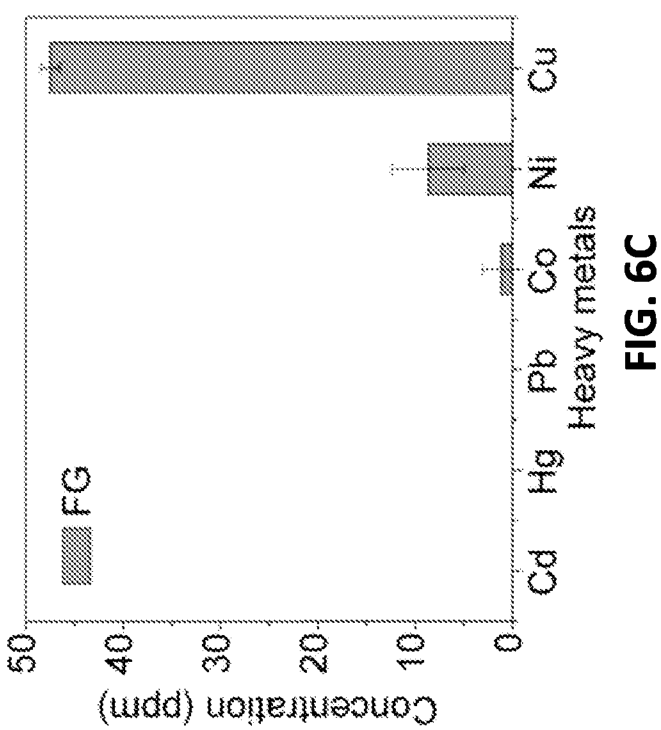

Flash graphene (FG) was also used as the conductive additive. The FG was synthesized by using Metcoke as the precursor. The concentrations of heavy metals in the FG were Cd undetectable, Hg undetectable, Pb undetectable, Co~1.1 ppm, Ni~8.6 ppm, and Cu~47 ppm. FIG. 6C These values were somewhat lower than those in Metcoke raw materials (FIG. 6A), which is caused by the evaporative loss of the heavy metals during the flash graphene synthesis process. In addition, these values are far below that of the contaminated soil (Cd~100 ppm, Hg~200 ppm, Pb~1000 ppm, Co~200 ppm, Ni~10000 ppm, and Cu~10000 ppm, FIG. 5A), and did not introduce significant error during the FJH process. The removal efficiencies of heavy metals was >60% (FIG. 6D), which is somewhat less than that from using carbon black as additive. FIG. 5C. The reason should be similar with that of the Metcoke as conductive additive: the first is that the carbon black has a better conductivity than the FG (R~1.0Ω for CB as additive, and R~1.5Ω for FG as additive), and the second is that carbon black has a much smaller particle size and much higher surface area than FG.

Thus, in both cases, removal efficiencies of >60% in a single FJH pulse were realized, which was somewhat smaller than that by using CB as the conductive additives. Again, this might be due to the smaller particle size of CB that permit a more uniform heating during the FJH process.

Figure 5D:
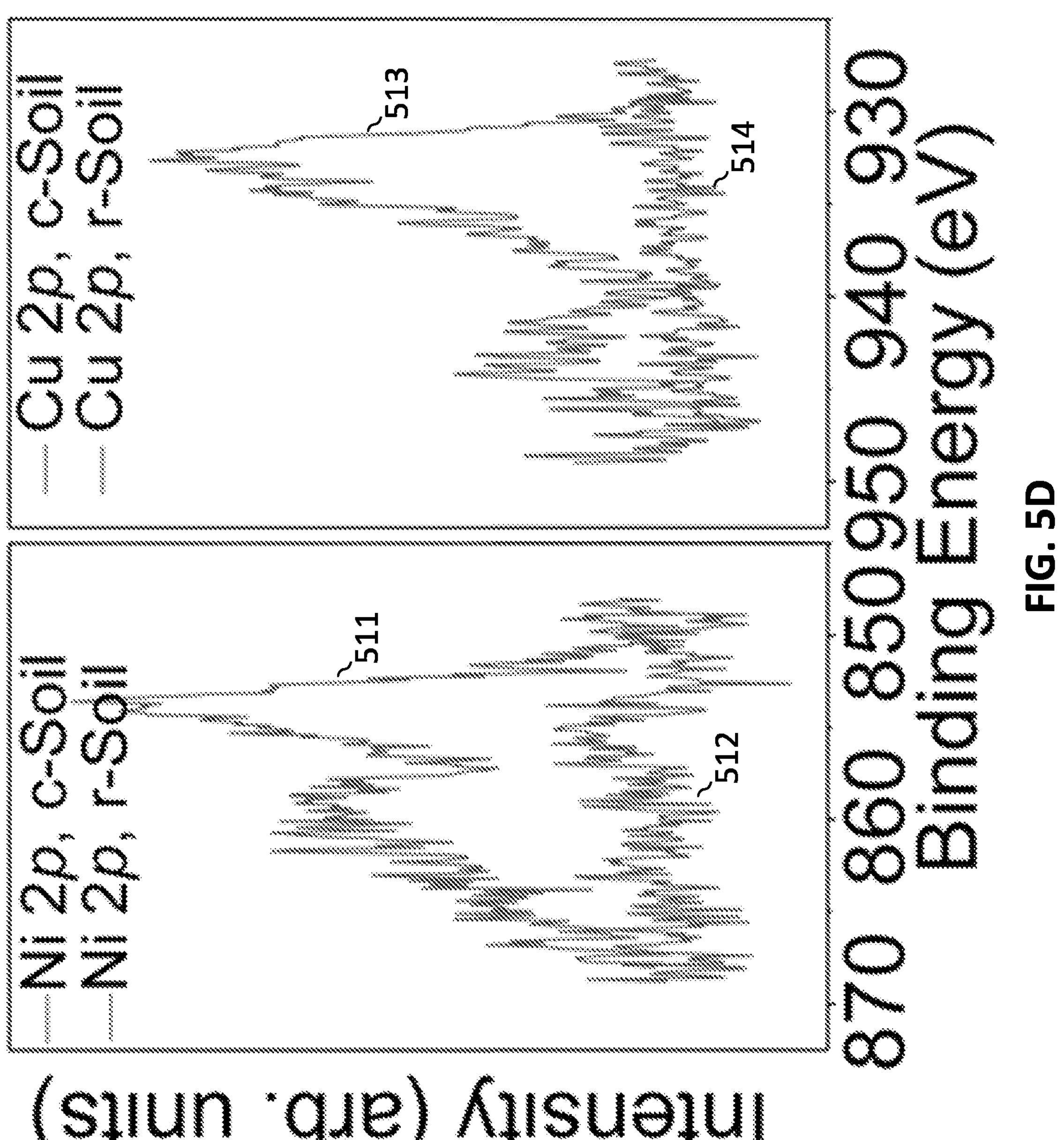

To further demonstrate the removal of heavy metals, X-ray photoelectron spectroscopy (XPS) characterization was conducted on the c-Soil and r-Soil. See FIG. 5D, with curves 511-514 for (i) Ni 2p, c-Soil, (ii) Ni 2p, r-Soil, (iii) Cu 2p, c-Soil, (iv) Cu 2p, r-Soil, respectively. The Ni and Cu peaks were clearly identified for the c-Soil (see curves 511 and 513); intriguingly, no Cu or Ni peak were detectable for the r-Soil (see curves 512 and 514), indicating the efficient removal of heavy metals.

Figures 5E, 5F:
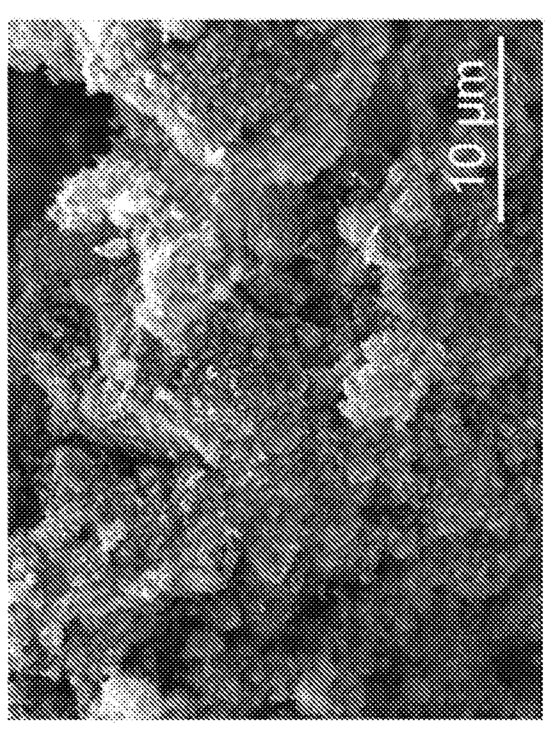
Figures 7A, 7B:
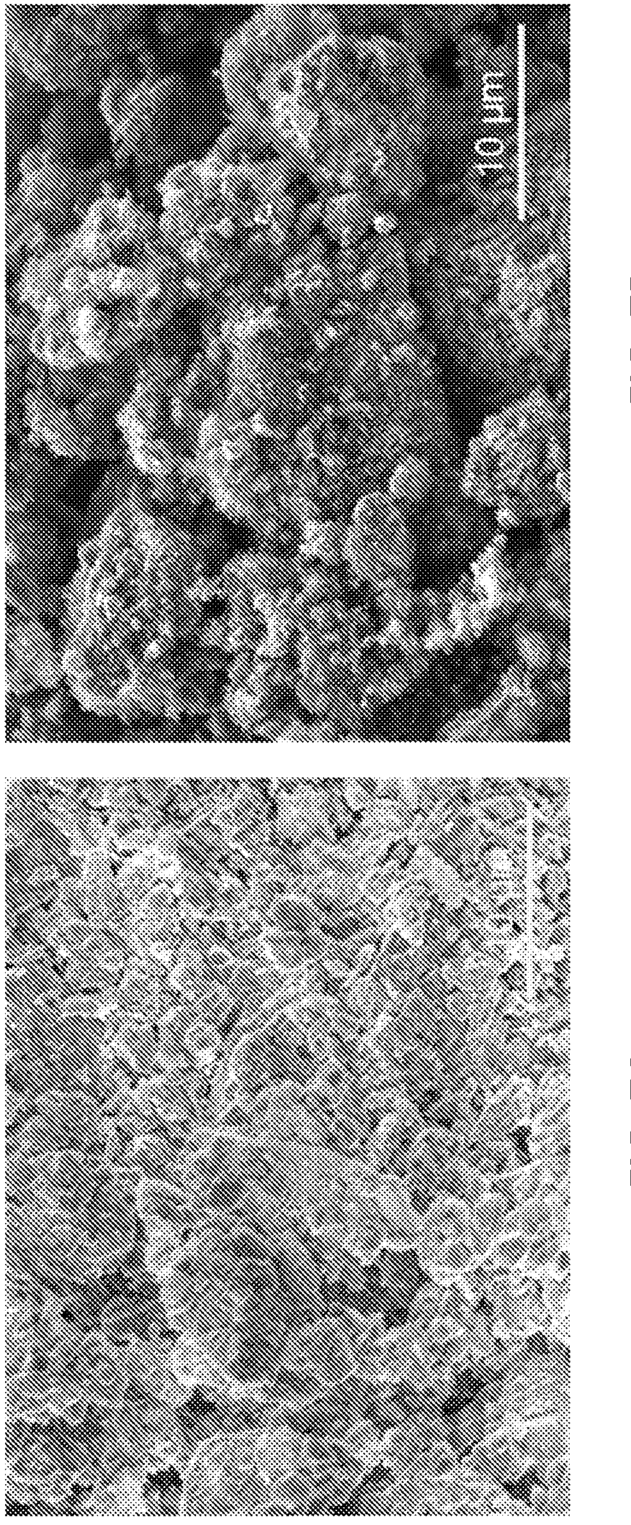
FIGS. 7A-7B show the SEM characterization of soil.

The main crystalline composition of the soil before and after FJH were characterized by X-ray diffraction (XRD). Quartz ($SiO_2$) and calcite ($CaCO_3$) were found to be the major crystal components of the soil. See FIG. 5E. After FJH, the quartz remained the major component of the r-Soil (FIG. 5E); however, the calcite was absent, presumably due to its thermal decomposition during the FJH process by $CaCO_3$=$CaO$+$CO_2$. The morphology of the r-Soil by scanning electron microscopy (SEM) after FJH showed the fine powder feature (FIG. 5F), which is similar to that of the c-Soil (FIGS. 7A-7B). The above analysis demonstrated that, other than the removal of the heavy metals, the major composition and morphology of the soil were not significantly changed by the FJH process, which is a favorable characteristic for the reuse of the remediated soil.

Reducing the Heavy Metals Content to within the Safe Limit

Unlike the physicochemical adsorption methods that rely on the capacity of sorbents [Bolan 2014], there is no capacity limit for the FJH process to remove heavy metals. The concentration of heavy metals in c-Soil could be continuously reduced by merely increasing the number of FJH pulses. The concentrations of all representative heavy metals were reduced to below the California Human Health Screening Levels (CHHSL) for residential locales [Cal OEHHA 2010] by 2 to 3 FJH pulses, where each pulse is only 1 s. See FIGS. 8A-8F.

Figures 8A, 8B, 8C, 8D, 8E, 8F:
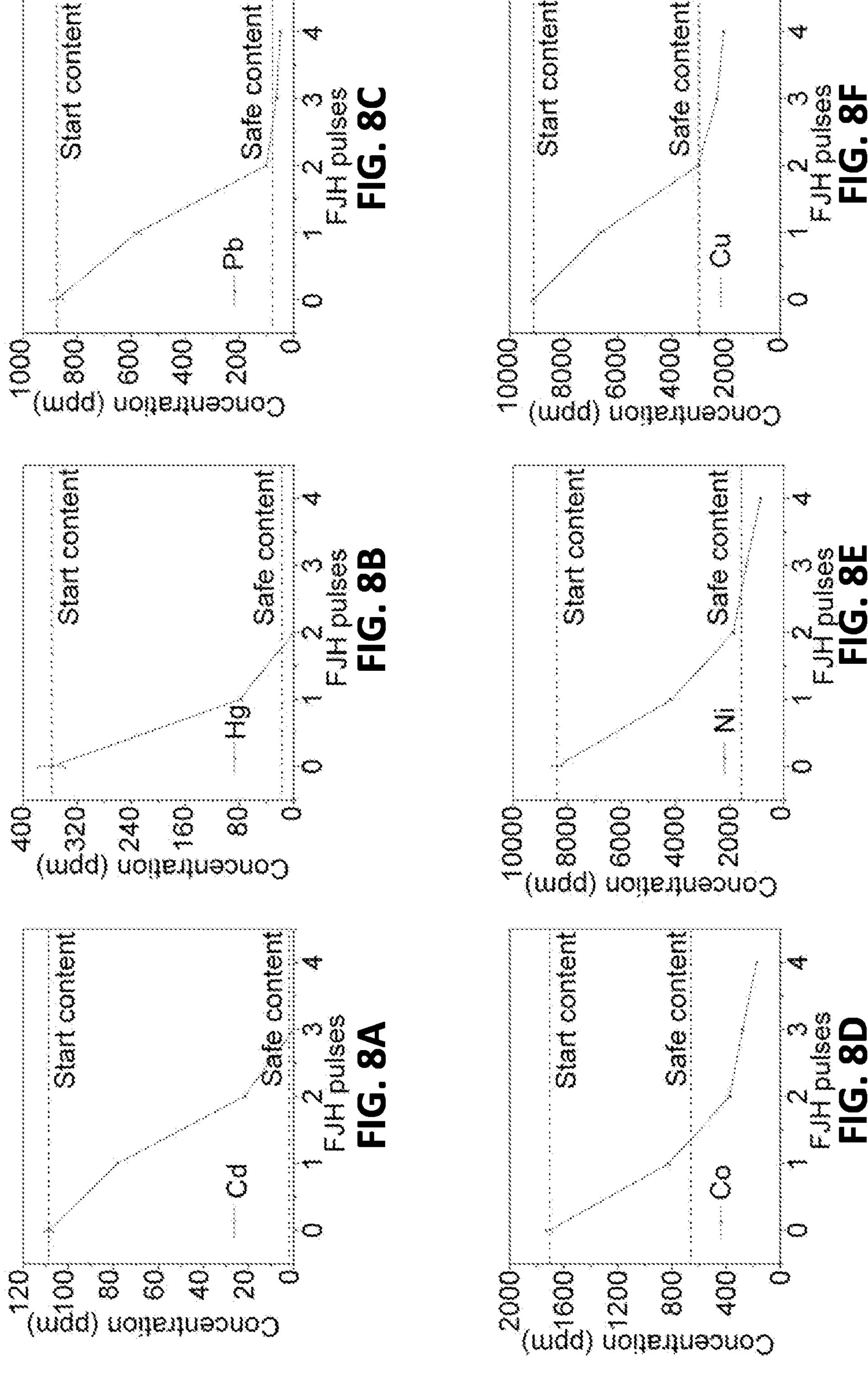
FIGS. 8A-8F show reducing the heavy metal contents to within the safe limit by multiple FJH pulses. The contents of heavy metals in soil after repetitive FJH pulses are shown in FIGS. 8A-8F for Cd, Cu, Ni, Pb, Co, and Hg, respectively. The safe contents are from the standard of CHHSL [Cal OEHHA 2010] The error bars denote the standard deviation where n=3.

The number of pulses depends on their initial concentrations, the safety thresholds and the vapor pressure of specific heavy metal. Among all heavy metals, Cd and Hg are the most toxic and have the strictest standards of 1.7 ppm and 18 ppm, respectively (FIGS. 8A-8B). Due to the high vapor pressure of Cd and Hg (FIG. 3E), their concentrations were greatly reduced to undetectable levels using ICP-OES after 3 and 2 pulses, respectively (FIGS. 8A-8B). Pb has an intermediate vapor pressure (FIG. 3E) and its concentration was reduced to within the safe content by 3 FJH pulses (FIG. 8C). In contrast, Co, Ni, and Cu have relatively low vapor pressures (FIG. 3E) and hence their concentrations are relatively difficult to be reduced to a very low level. Nevertheless, Co, Ni, and Cu are less toxic metals and have the safe contents of hundreds or thousands of ppm, and, hence, were likewise reduced to safe-content levels (FIGS. 8D-8F).

Figure 9B:
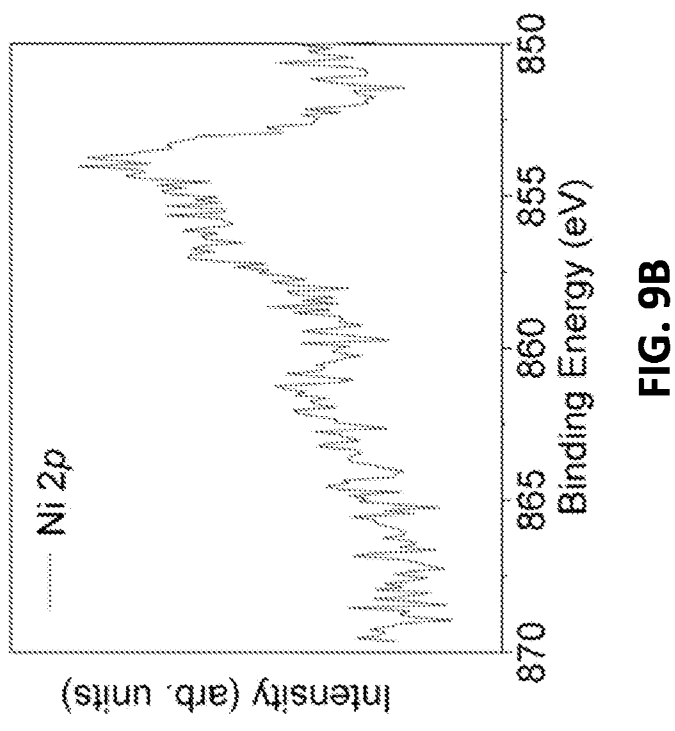
FIGS. 9A-9B show the XPS characterization of the quartz tube after FJH.
Figure 9A:
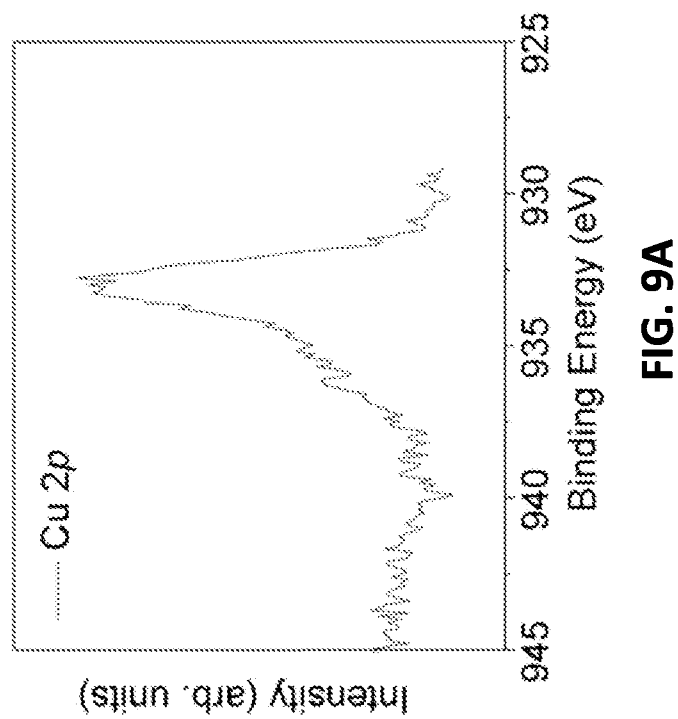

The evaporated heavy metals could be further collected. XPS analysis of the inner side of the quartz tube after FJH was conducted. See FIGS. 9A-9B. The heavy metals were detected on the quartz tube side walls. In the other cases, where a vacuum system was integrated, the evaporative heavy metals could also be collected in a cold trap, similar to precious metals trapping from electronic wastes using FJH. [Deng 2021; Tour PCT September 2021 Applications].

Removal of Organic Contaminants by FJH

In addition to the heavy metals, organic compounds like PAHs [Hussar 2012; Zhang S 2017], PCB [Chekol 2004], OCP [Liu 2021], and TPH [Streche 2018] represent the other severe pollutants in contaminated soil. Here, PAHs were used as examples to show the organic contaminant removal capability of the FJH process. Three PAHs, pyrene, fluorene, and benz[a]anthracene were used. Similar to the heavy metal contamination, the clean soil was first spiked by individual PAH. Then, CB (~30 wt %) was mixed with the PAH-contaminated soil as a conductive additive for FJH. See detail conditions above in TABLE II. The PAH in c-Soil and r-Soil was extracted into an organic phase by solvent extraction using a method from the EPA, USA. [US EPA 2007]. The extraction solvent was composed of 1:1 vol:vol ethanol: dichloromethane (99.5%, Fischer Chemical). Soil samples (~10 mg) were mixed with the extraction solvent (~5 mL) and dispersed in a bath sonicator for 5 min. The solution was filtered to remove all soils and carbon black using a sand core funnel (Class F). The clear filtrate was diluted with ethanol until the concentration of analyte was within the calibration range.

Figures 10A, 10B, 10C:
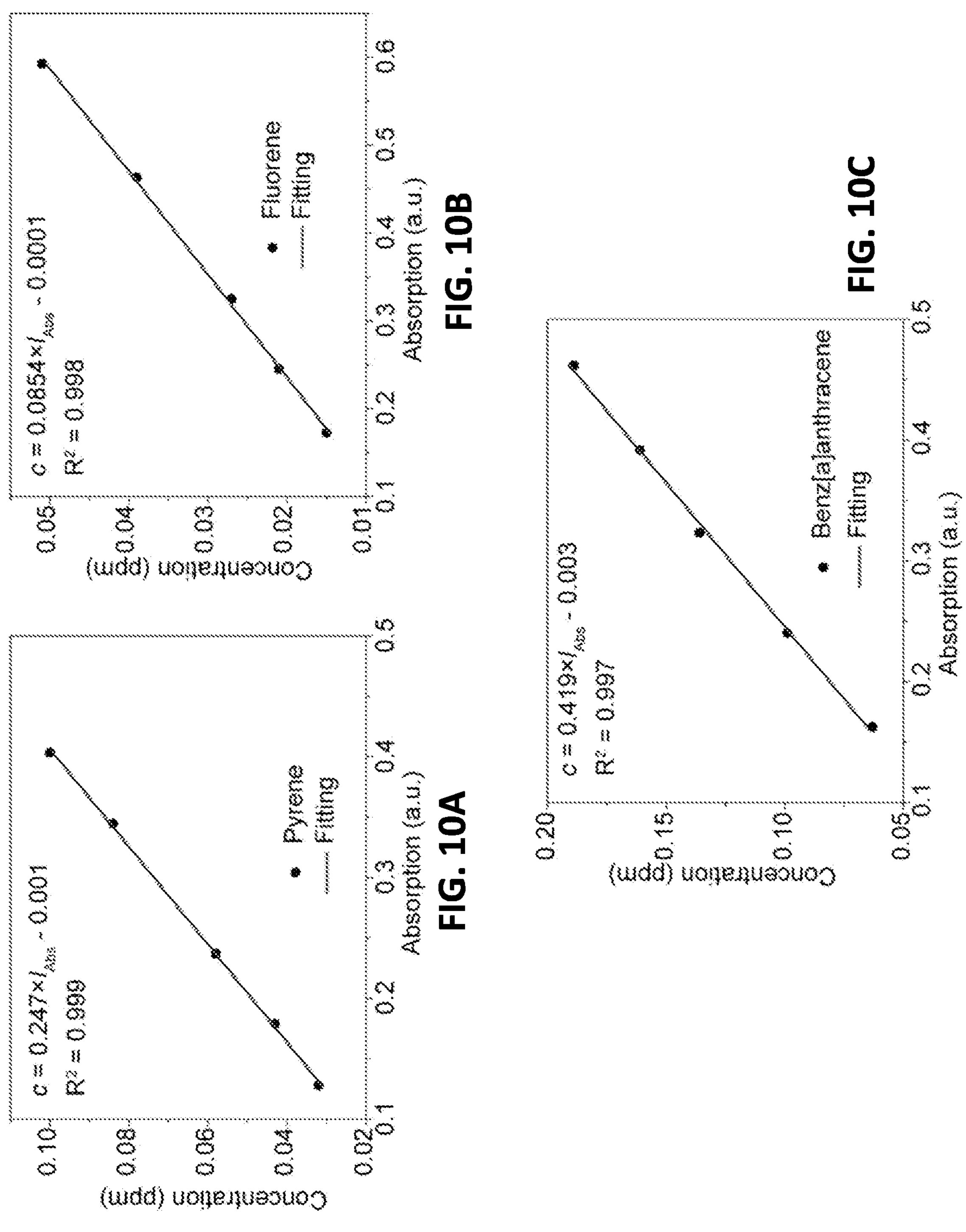
FIGS. 10A-10C show calibration curves for PAH by UV-Vis spectra.

The concentration of PAH was measured by an ultraviolet-visible (UV-Vis) spectrophotometry (Shimadzu UV-3600 Plus spectrophotometer). [See Giger 1974]. The good linearity of the calibration curves in FIGS. 10A-10C demonstrates the validity of the quantification method.

Figure 11A:
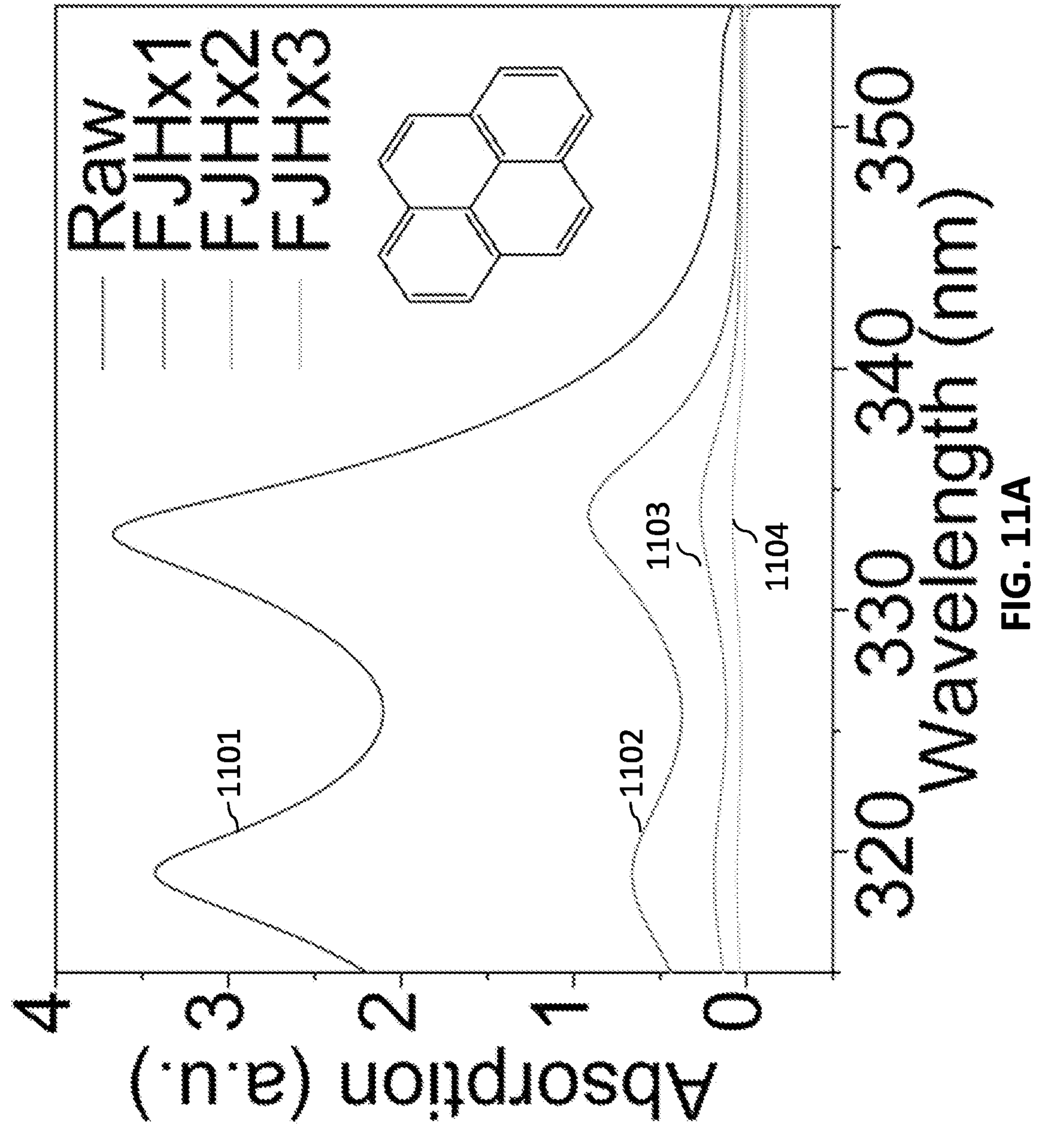
FIGS. 11A-11F show removal of PAH in contaminated soil by FJH.
Figure 11B:
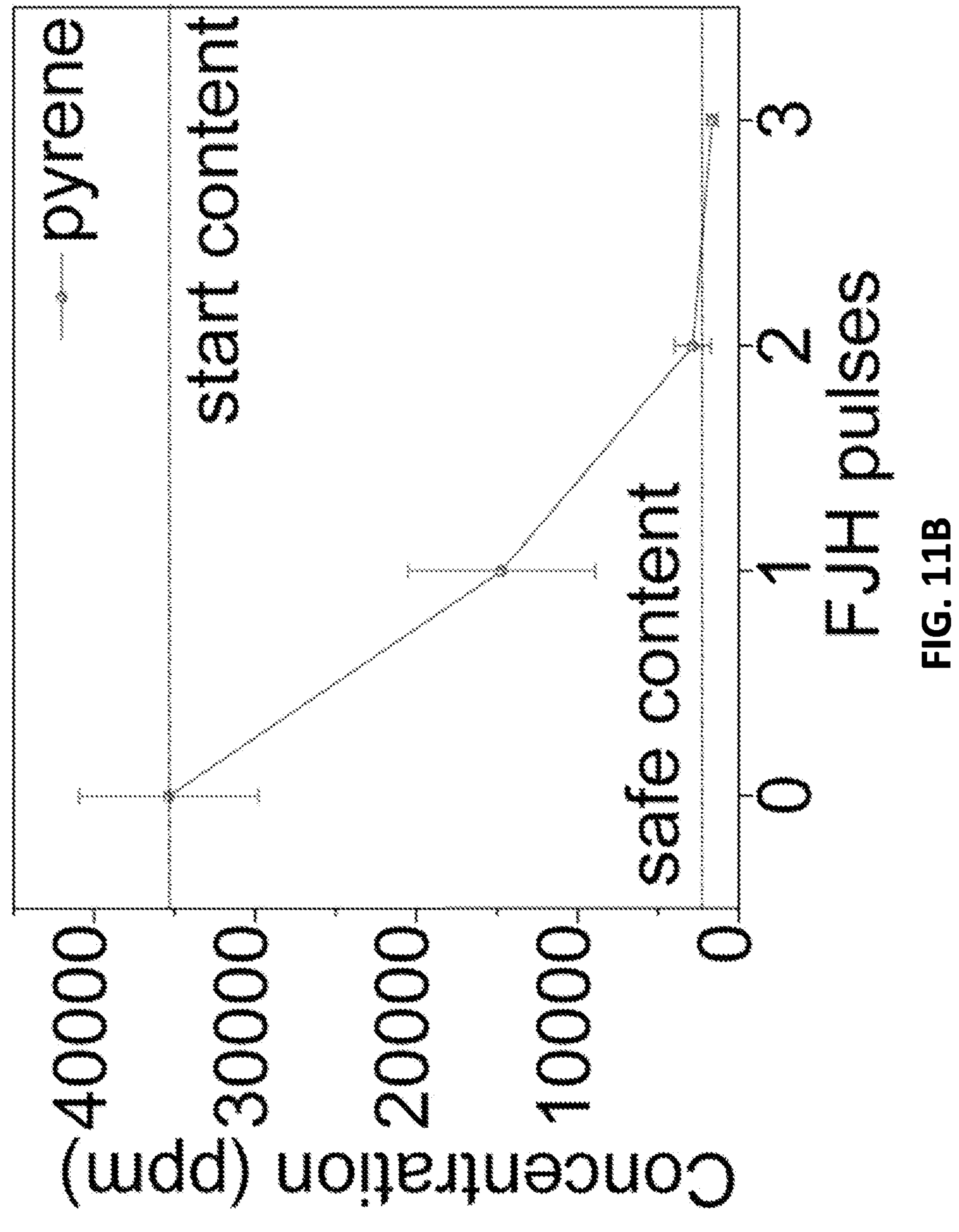

The UV adsorption spectra of pyrene exhibit two characteristic peaks at ~319 nm and ~333 nm. See FIG. 11A, with curves 1101-1104 for raw, FJHx1, FJHx2, and FJHx3, respectively. As shown by curves 1101-1104, the intensities of these peaks were progressively decreased along with increasing the FJH pulses. After 3 FJH pulses, the concentration of pyrene was reduced to below the preliminary remedial goals (PRG) of 2300 ppm [Hussar 2012]. See FIG. 11B.

Figure 11C:
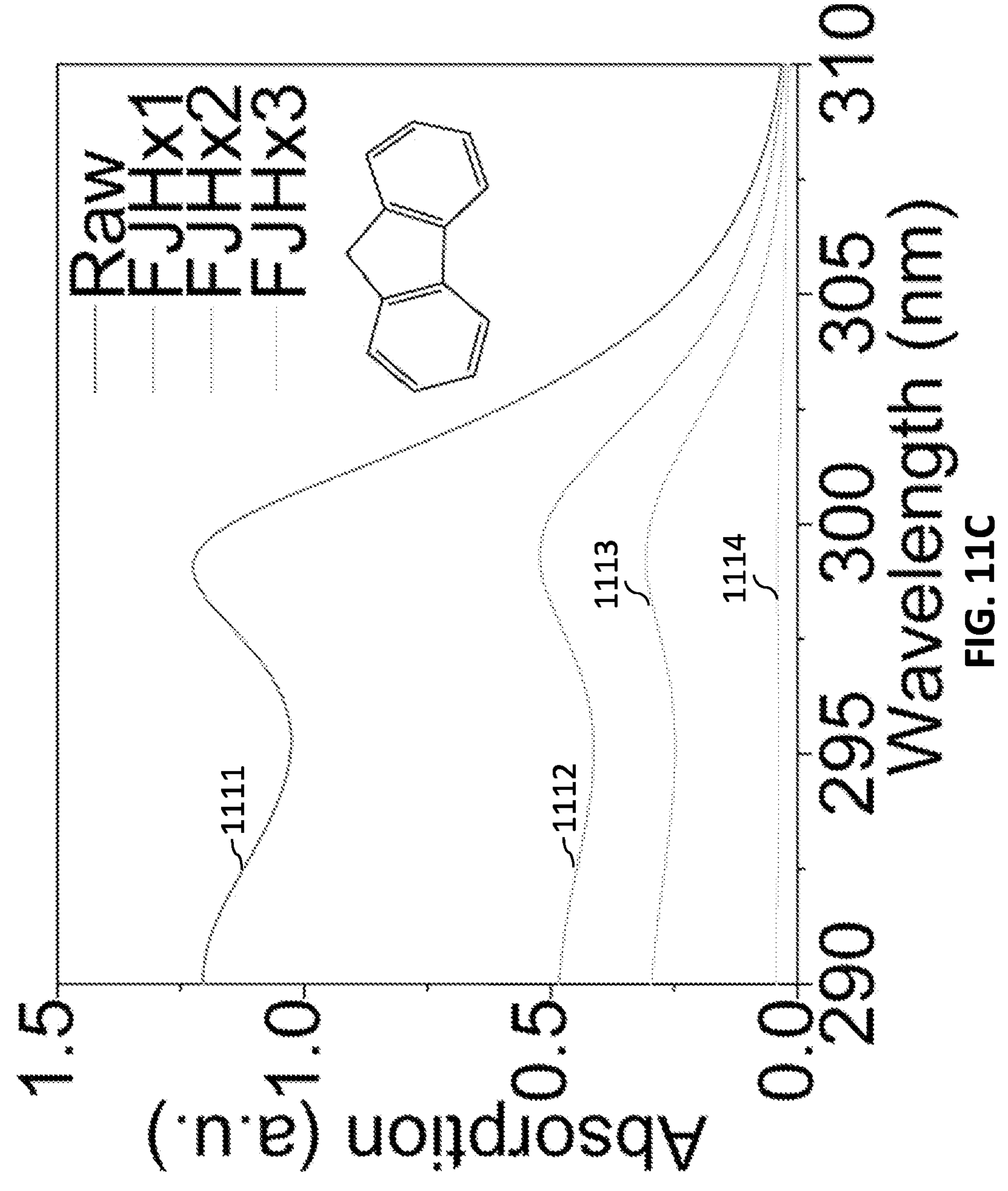
Figure 11D:
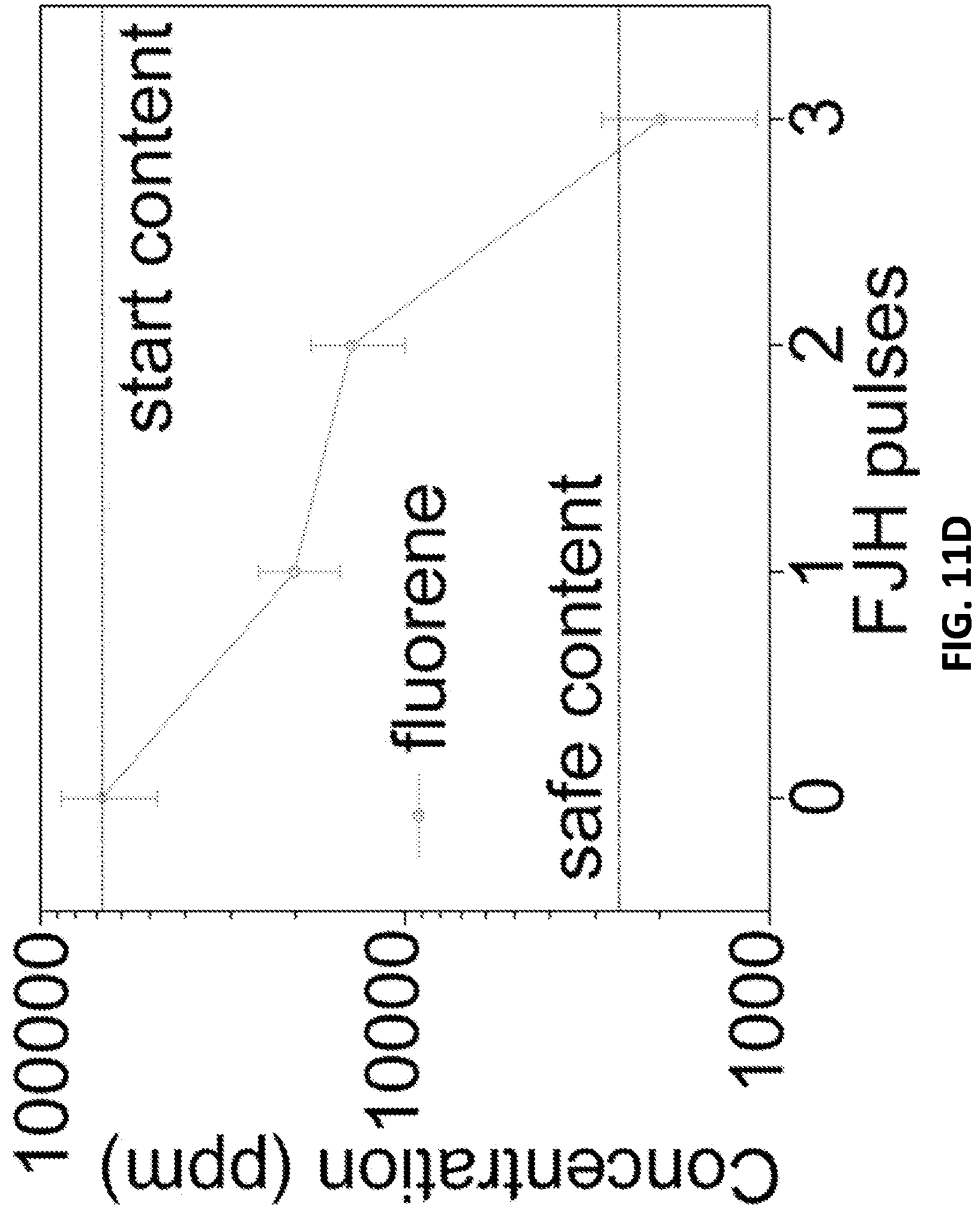

Similarly, the fluorene exhibits characteristic adsorption peak at ~299 nm, whose intensity was greatly reduced after FJH (FIG. 11C, with curves 1111-1114 for raw, FJHx1, FJHx2, and FJHx3, respectively), and to below the PRG of 2700 ppm [Hussar 2012] by 3 FJH pulses. See FIG. 11D.

Figure 11E:
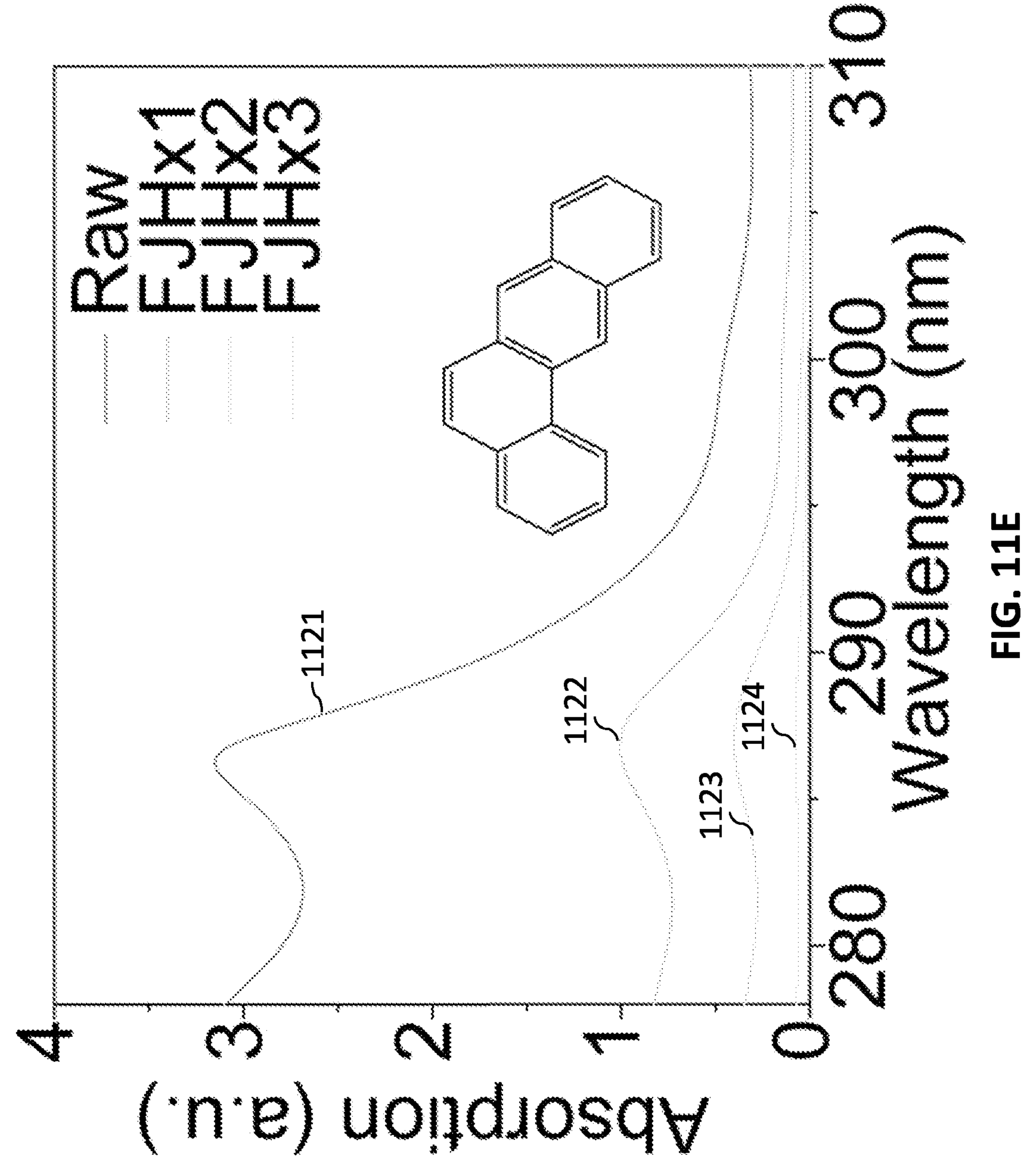
Figure 11F:
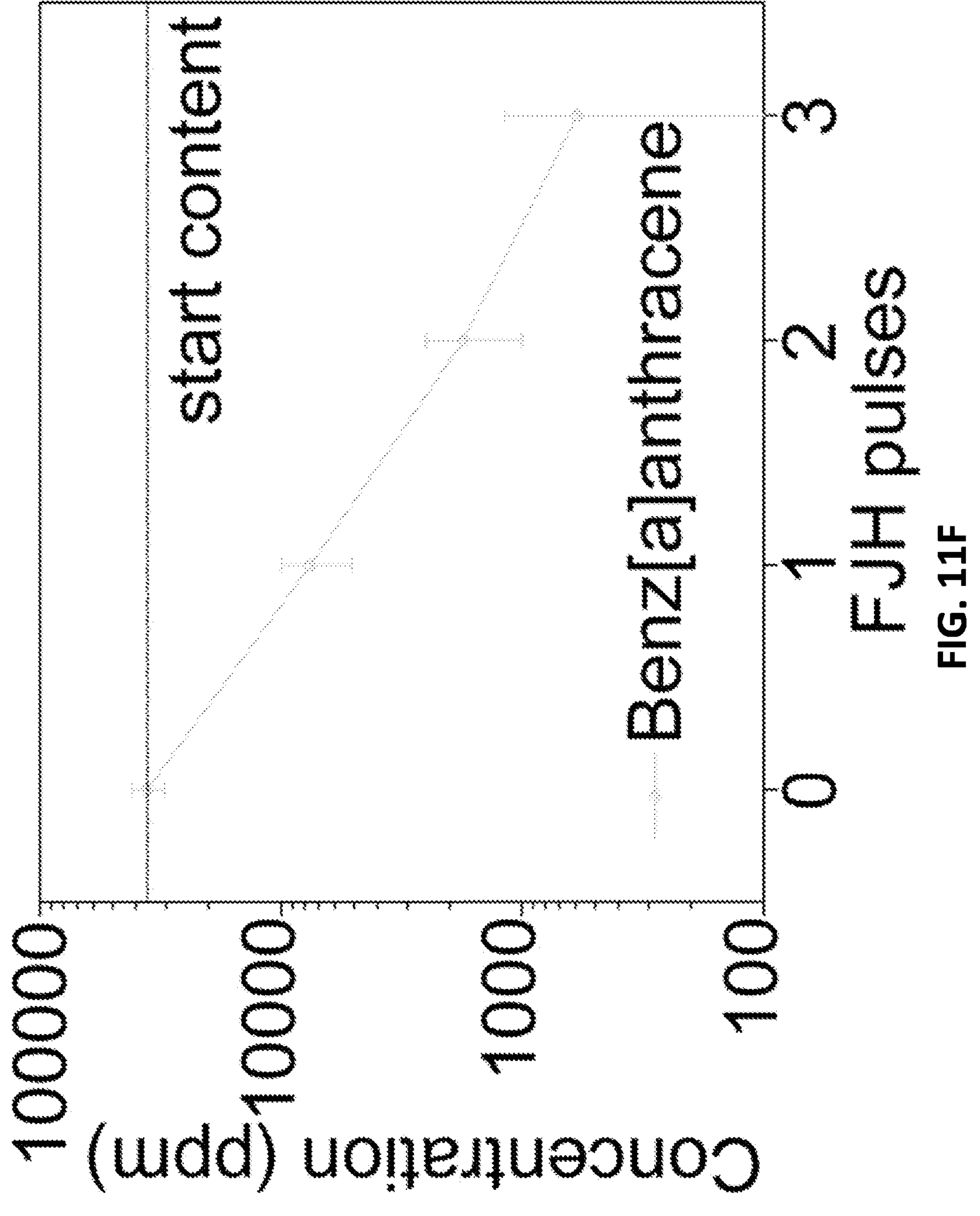

The same strategy pertains to the remediation of benz[a] anthracene contaminated soil (FIG. 11E, with curves 1121-1124 for raw, FJHx1, FJHx2, and FJHx3, respectively, and FIG. 11F), further demonstrating the generality of the FJH process for removal of organic pollutants. Benz[a]anthracene has a very low PRG of 0.62 ppm [Hussar 2012], which is beyond the detection limit of our present quantification method; nevertheless, its content was reduced by >98% by 3 FJH pulses. See FIG. 11F.

Figures 12A, 12B, 12C:
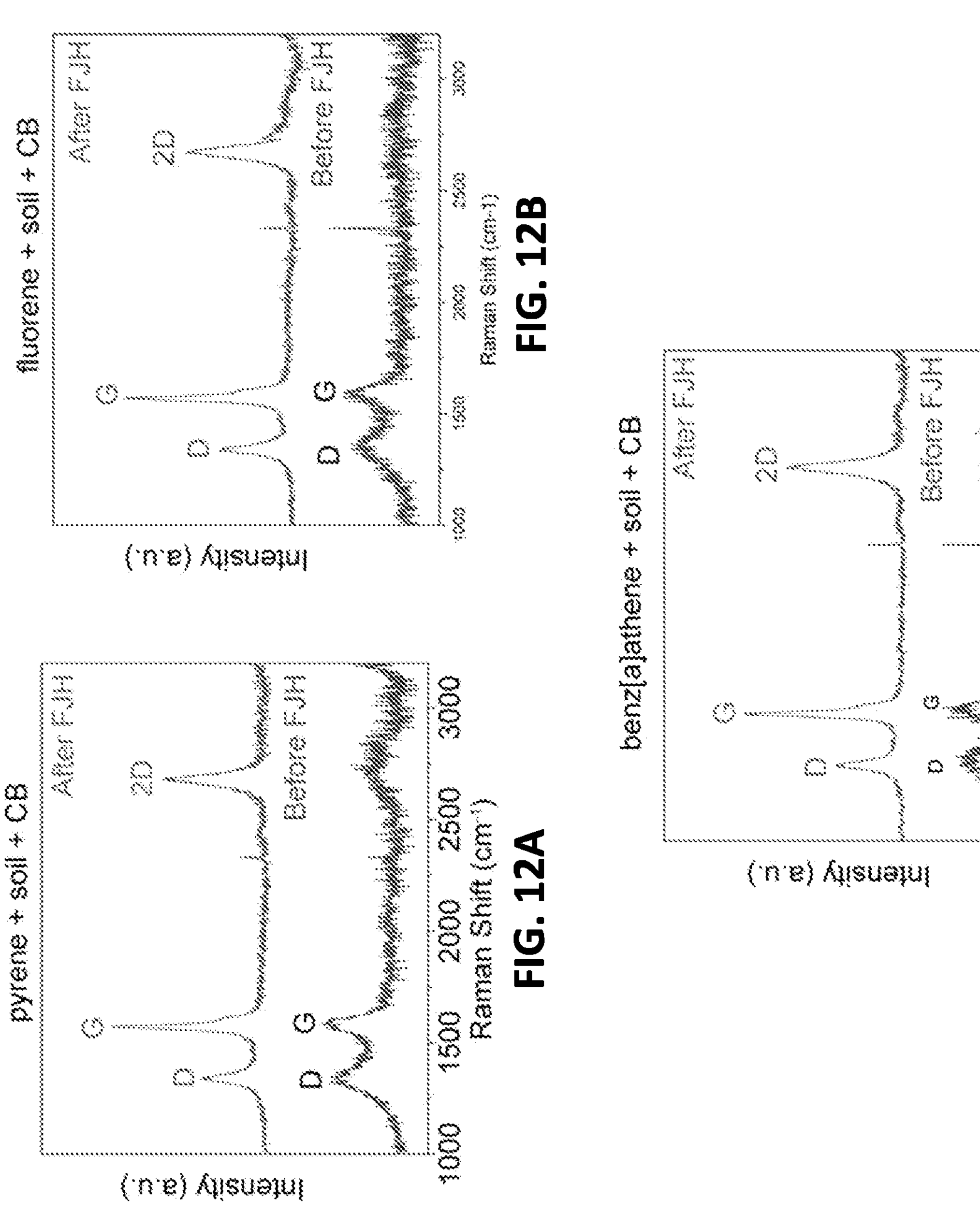
FIGS. 12A-12C show Raman spectra of the PAH contaminated soil before and after FJH.

The ultrahigh temperature during the FJH process could graphitize the carbon-containing precursors, as demonstrated by the synthesis of flash graphene from various resources in previous reports by the inventors. [Luong 2020; Algozeeb 2020; Wyss 2021; Advincula 2021; Stanford 2020; Tour PCT '000 Application; Tour PCT September 2021 Applications]. The Raman spectra of the r-Soil after flash Joule heating the PAH-contaminated soil show strong 2D bands (FIGS. 12A-12C), indicating the conversion of the CB additive and these organic compounds to the graphitized carbon. While graphitized carbon has very low toxicity[41] [Starý 2003], the chemical stability of graphite greatly retards its microbial decomposition, essentially removing it from the global $CO_2$ cycle. [Galvez 2013].

Techno-Economic Analysis and Scalability of the FJH Process

The energy consumption and cost of the FJH process for soil remediation were evaluated in view of its economic benefit. Due to the direct sample heating feature, the ultrafast heating/cooling rate, and the short treatment duration, the FJH process for soil remediation is highly energy efficient with the electrical consumption of ~420 kWh $ton^{-1}$, or ~\$8 $ton^{-1}$.

The energy consumption was calculated using Equation (2).

$$E = \frac{(V_1^2 - V_2^2) \times c}{2 \times M} \tag{2}$$

where E is the energy per gram (kJ $g^{-1}$), $V_1$ and $V_2$ are the voltage before and after FJH, respectively, C is the capacitance (C=60 mF), and M is the mass per batch.

For a typical trial with $V_1$=100 V, $V_2$=0 V, and M=0.2 g, the energy is calculated to be:

$$E = 15 \text{ kJ g}^{-1} = 4.2 \times 10^{-4} \text{ kWh g}^{-1} = 420 \text{ kWh ton}^{-1}$$

Given that the industrial price of electrical energy in West Texas, USA is presently \$0.02 $kWh^{-1}$, current cost for treatment of 1 ton of contaminated soil would be P=\$8.4 $ton^{-1}$.

As a comparison, the cost of treating contaminated soil with existing innovative technologies ranges from \$50,000 to \$100,000 per acre-foot. [NJDEP 2022]. Considering the bulk density of soil being ~1.33 g $cm^{-3}$, this corresponds to the cost of \$30-60 $ton^{-1}$. Hence, the cost of the FJH process is ~12% to 25% of the cost compared to other innovative soil remediation technologies.

The FJH process is scalable. [Deng 2021; Deng I 2022; Deng II 2022; Tour PCT '000 Application; Tour PCT September 2021 Applications]. Since the evaporative removal of the heavy metals and graphitization of organic contaminants rely mainly on the maximum achievable temperature, a constant temperature should be maintained when scaling up the FJH process for soil remediation.

Since the removal of the heavy metals and graphitization of organic contaminants mostly rely on the maximum temperature of the FJH process, the available temperature across the sample is the key point when scaling up the FJH process. For Joule heating, the heat amount (Q) is calculated by Equation (3).

$$Q = I^2 Rt \tag{3}$$

where I is the current passing through the sample, R is the resistance of the sample, and t is the heating time. The heat amount per volume ($Q_v$) is then determined by Equation (4)

$$Q_v = j^2 \rho_e t \tag{4}$$

where j is the current density, $\rho_e$ is the electrical resistivity of the sample, and t is the heating time.

The change of temperature ($\Delta T$) is proportional to the heat amount according to Equation (5).

$$Q = C_p m \Delta T \tag{5}$$

where $C_p$ is heat capacity of the sample, and m is the mass of the sample. Again, Equation (5) could be revised per volume to Equation (6), $$Q_v = C_p \rho_m \Delta T \quad (6)$$

where $\rho_m$ is the density of the sample. Since the $C_p$ and ρ were constant for a specific kind of sample, maintaining a constant Q, is a key to keeping the same available temperature.

Since the electrical resistivity ($\rho_e$) of the sample is constant, to maintain a constant Q, and t when scaling up the sample, according to Equation (6) a constant current density (j) should be maintain.

The charge (q) in the capacitor bank is calculated by Equation (7).

$$q = CV \quad (7)$$

where C is the total capacitance, and V is the charging voltage. Supposing the charges in the capacitor bank are discharged in the heating time (t), the current (I) passing through the sample could be calculated by Equation (8).

$$I = \frac{q}{t} \quad (8)$$

Hence, the current density (j) can be calculated by Equation (9).

$$j = \frac{I}{S} = \frac{CV}{St} \quad (9)$$

where S is the sample cross-sectional area. In the circumstance in which the samples are cylinder-shaped in a quartz tube, the sample mass (m) can be calculated by Equation (10).

$$m = \rho_m SL \quad (10)$$

where $\rho_m$ is the sample density, S is the sample cross-sectional area, and L is the sample length. The sample density ($\rho_m$) is constant considering the same compression of the sample.

Equation (11) can then be used obtain and determine the current density.

$$j = \frac{CV\rho_m L}{mt} \quad (11)$$

As discussed above, to increase the sample mass (m), a constant current density (j) should be maintained, which could be realized by the practices including: (1) linearly increasing the FJH voltage (V), and (2) linearly increasing the capacitance (C). According to the above, the mass per batch can thus be scaled up by linearly increasing the FJH voltage or capacitance.

The upscaling of the sample mass to 2 g and the removal efficiencies of heavy metals has been demonstrated to be comparable to the small-scale samples. FIGS. 13A-13D. By using an automated system, production rates have already realized of >10 kg $day^{-1}$ for the FJH process in a batch-to-batch manner.

A FJH system having a capacitor bank composed of 10 commercial aluminum electrolytic capacitor (450 V, 6 mF, Mouser #80-PEH200YX460BQU2) with the total capacitance of $C_0$=0.06 F. In a typical experiment, a FJH voltage of $V_0$=100 V and $C_o$=0.06 F were used for the treatment of sample with mass of $m_0$=0.2 g.

Figure 13A:
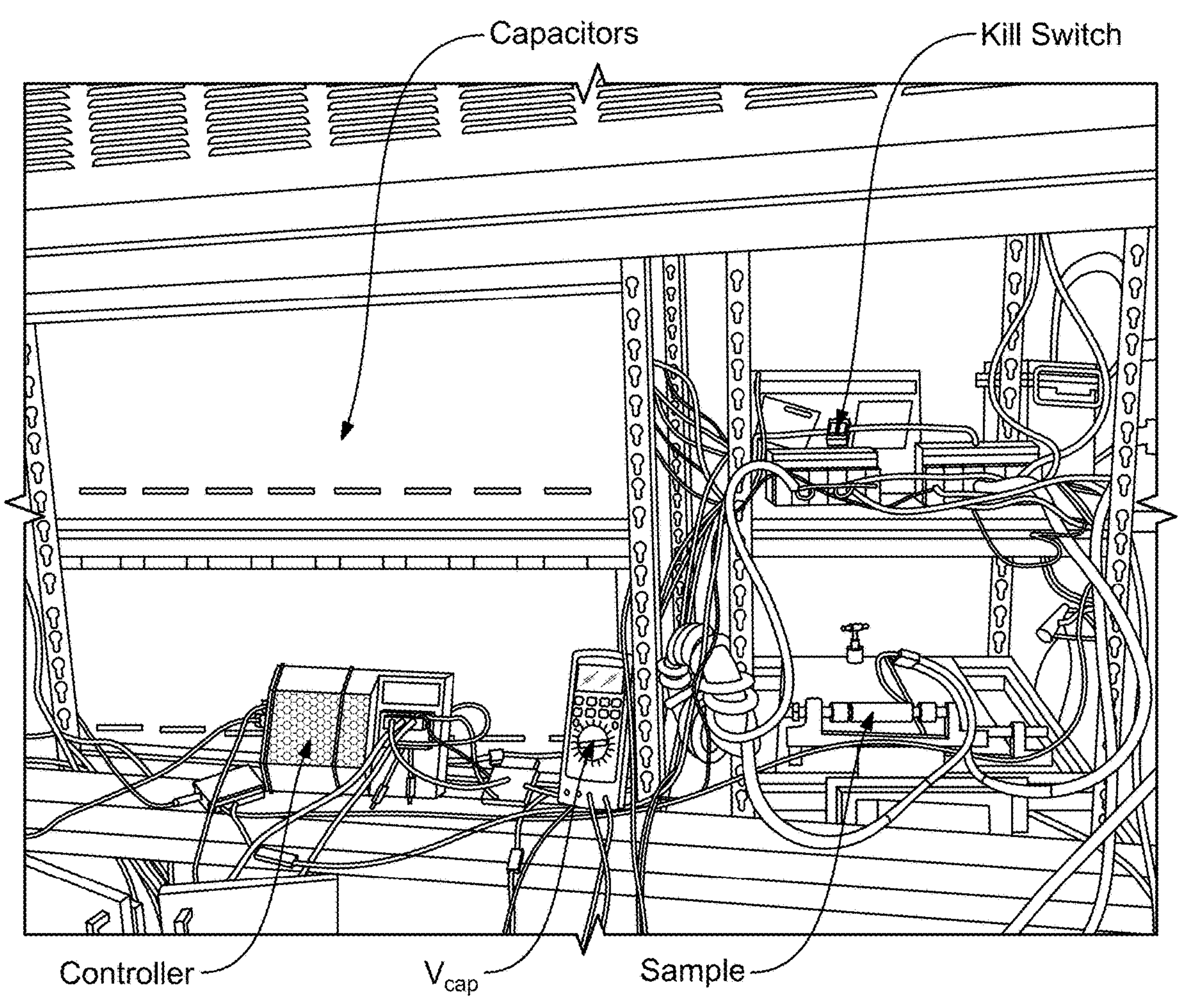
FIGS. 13A-13E show scaling up of the FJH process for soil remediation.
Figure 13B:
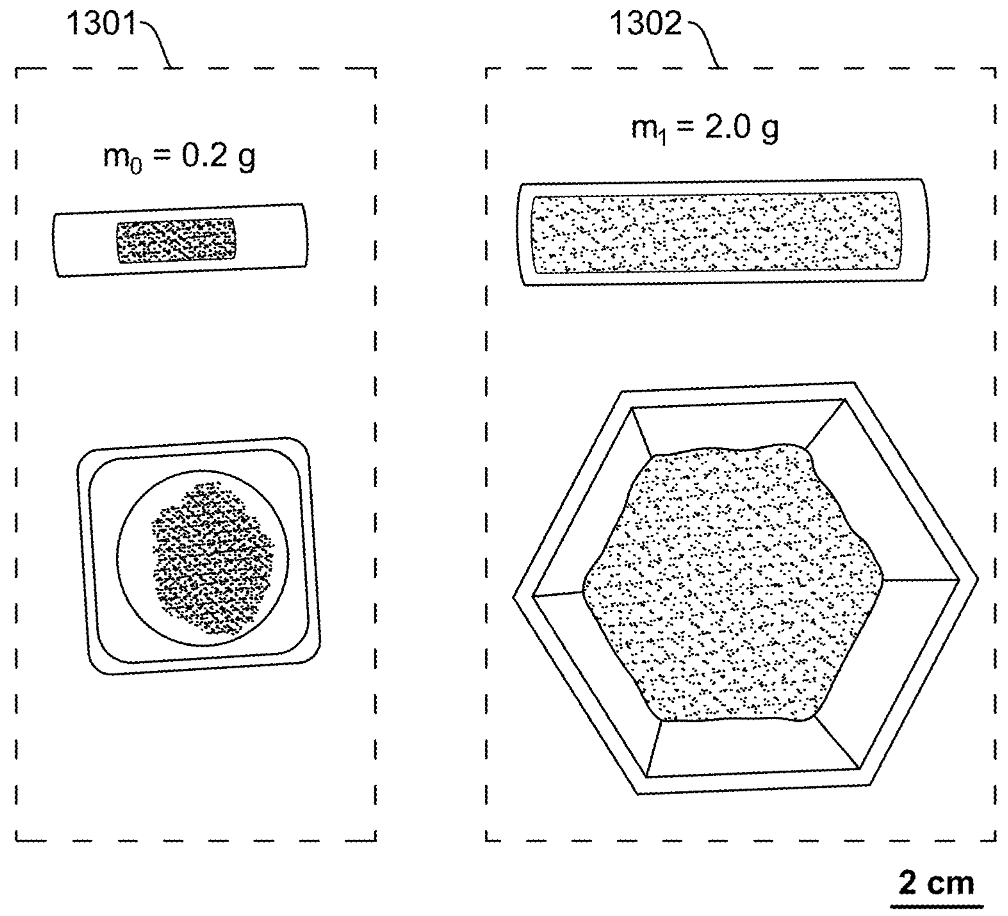

As discussed above with regard to the small-scale experiments (TABLE II), a sample mass of $m_0$=0.2 g was used (FIG. 13B, sample 1301) and the FJH condition of $V_0$=100 V and $C_0$=0.06 F. The temperature was measured to be ~3000° C. (FIG. 3D). The scaling up of the FJH to a scale with mass of $m_1$=2 g (FIG. 13B, samples 1302) had been further performed utilizing a FJH system with larger capacitance as shown in FIG. 13A. The capacitor bank of the FJH system shown in FIG. 13A had a total capacitance of $C_1$=0.624 F. According to Equation (11), formula of Equation (12) can be derived, $$\frac{m_1}{m_0} = \frac{C_1 V_1}{C_0 V_0} \quad (12)$$

Figures 13C, 13D:
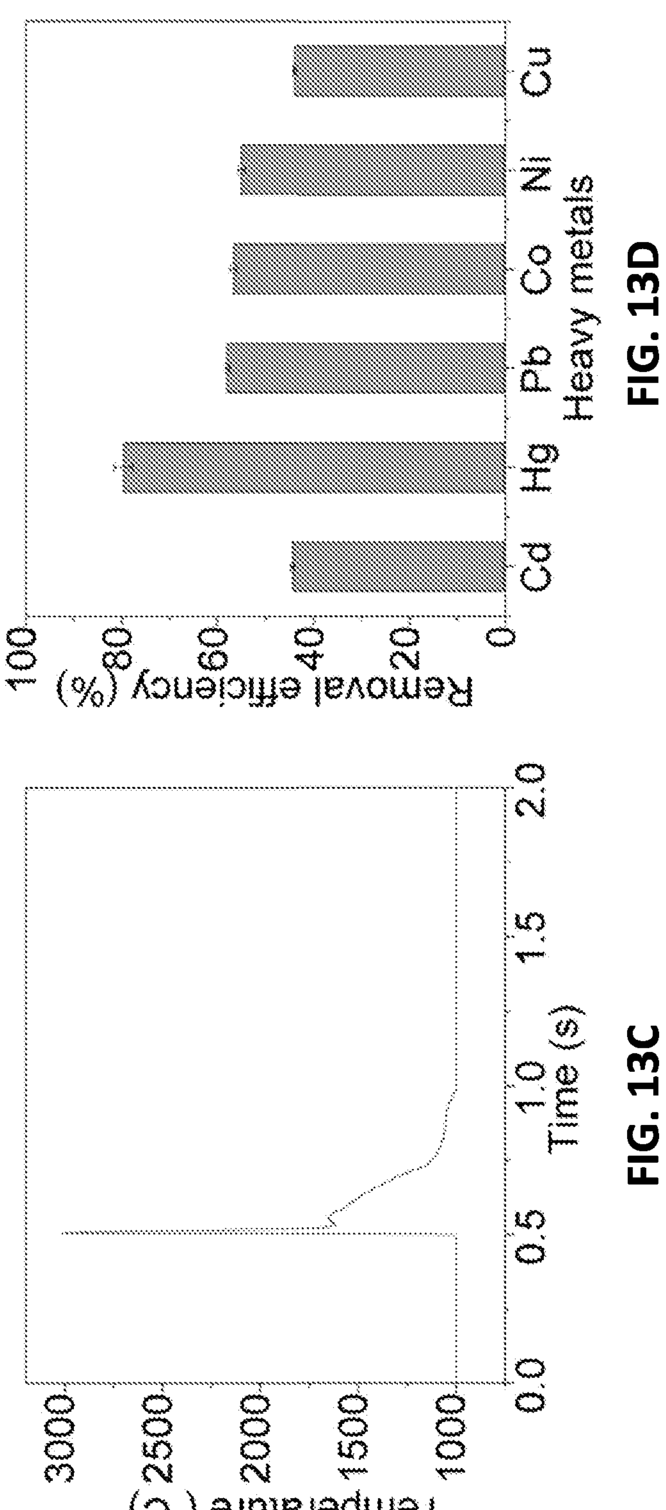

For the sample mass of $m_1$=2 g and $C_1$=0.624 F, a FJH voltage of $V_1$=120 V was used, thus fitting with the Equation (11). Since the temperature is a pertinent criterion for the heavy metal removal by evaporation and organic contaminants removal by graphitization, the temperature for the large-scale sample was recorded. FIG. 13C. It could be seen that the maximum temperature also reached ~3000° C., demonstrating the efficient scaling up of the FJH process. Similar to the small-scale sample, the concentration of the heavy metals in the r-Soil was reduced. In addition, the removal efficiency of heavy metals was calculated to be 40-80% for 1-pulse of FJH. FIG. 13D. This removal efficiency is comparable to that of the small-scale sample. FIG. 5B.

Figure 13E:
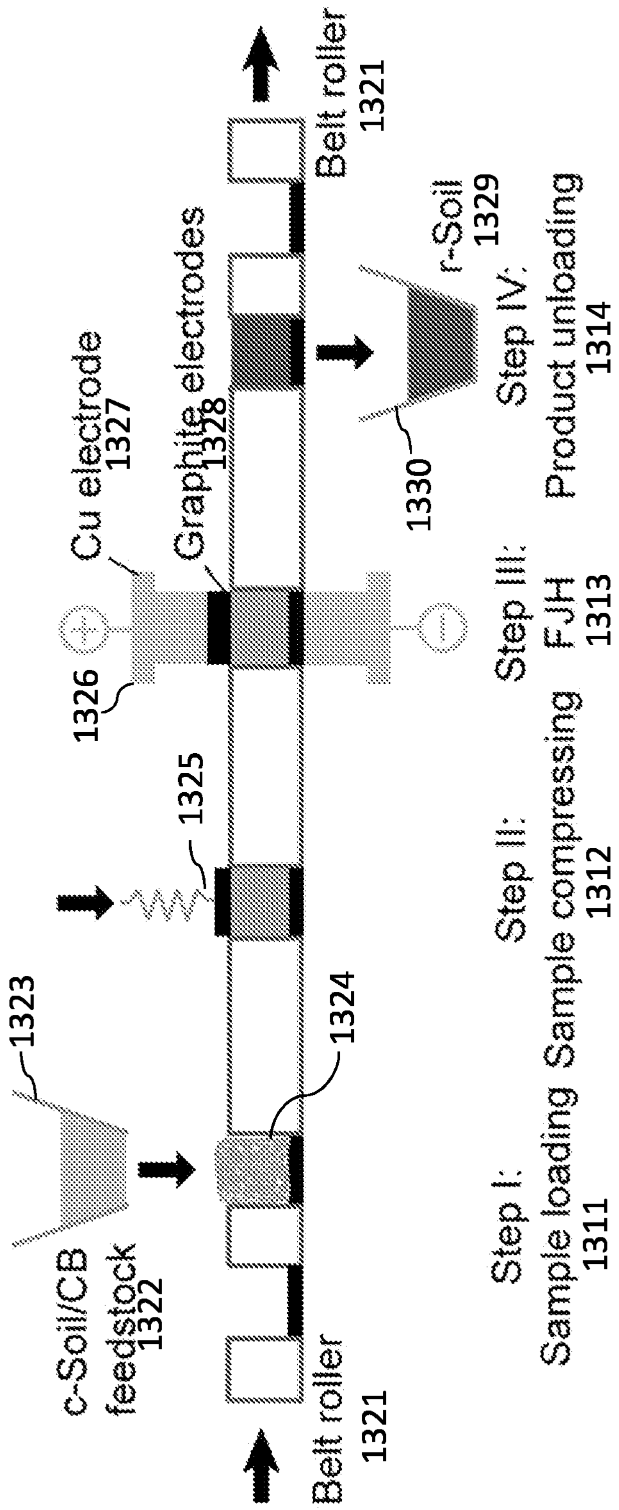

The FJH process could thus be integrated with some industrial scale-up technologies. For example, as shown in FIG. 13E, the assembly for performing the FJH process can include belt roller 1321 for continuous processing. In step 1311, the mixture of c-Soil/CB 1322 is loaded from c-Soil/CB source 1323 into chamber 1324. (Alternatively, c-Soil and CB (or other conductive additive that includes a carbon source) from different sources can be well mixed as being loaded into chamber 1324.) In step 1312, the mixture is compressed by compressor 1325 to proper resistance. In step 1313, the compressed sample undergoes the FJH process utilizing a FJH system 1326 having Cu electrode 1327 and graphite electrodes 1328. In step 1314, remediated soil 1329 is unloaded (into reservoir 1330), and the emptied chamber 1324 on belt roller 1321 is ready for next run. Alternatively, other continuous processes and well-established industrial scaling techniques could be applied for the FJH process.

Indeed, presently, the FJH process is undergoing industrial-scale scaling up for the conversion of carbon source to flash graphene [Luong 2020] by Universal Matter, Ltd. with the targeted production rate of 100 ton $day^{-1}$ by mid-2023. [Universal Matter 2022]. The equipment and processes designed and optimized for the flash graphene synthesis can be transferrable for the soil remediation process.

Capacitor Banks

As utilized in the embodiments discussed above, capacitors were used to provide the DC supply for the FJH (DC-FJH). Alternating current (AC) could also be used for the FJH process. [Algozeeb 2020; Tour PCT '000 Application; Tour PCT September 2021 Applications]. The application of AC source for FJH (AC-FJH) can also be used for soil remediation.

Figures 14A, 14B, 14C:
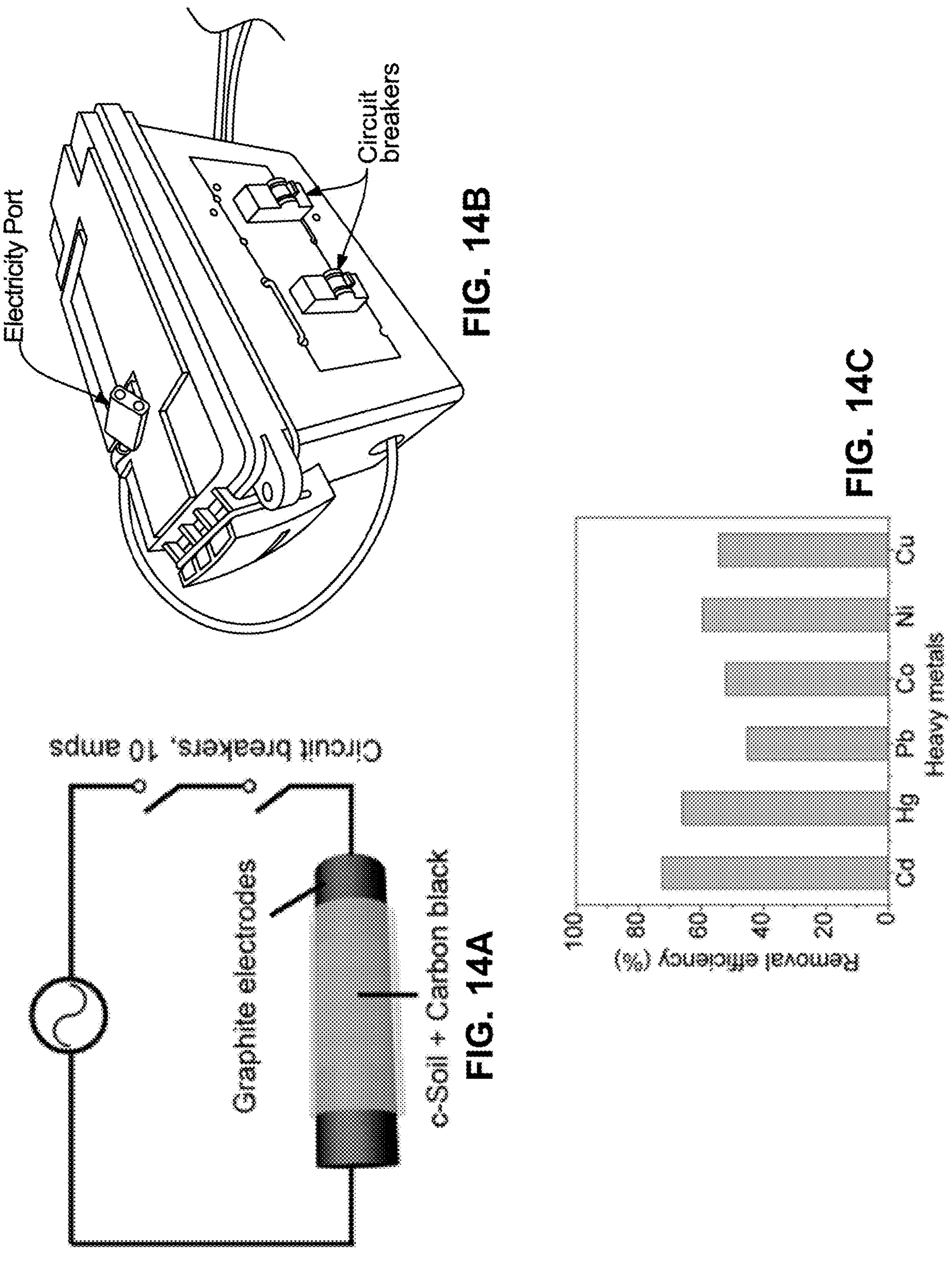
FIGS. 14A-14C show heavy metal removal using AC-FJH system.
Figure 15:
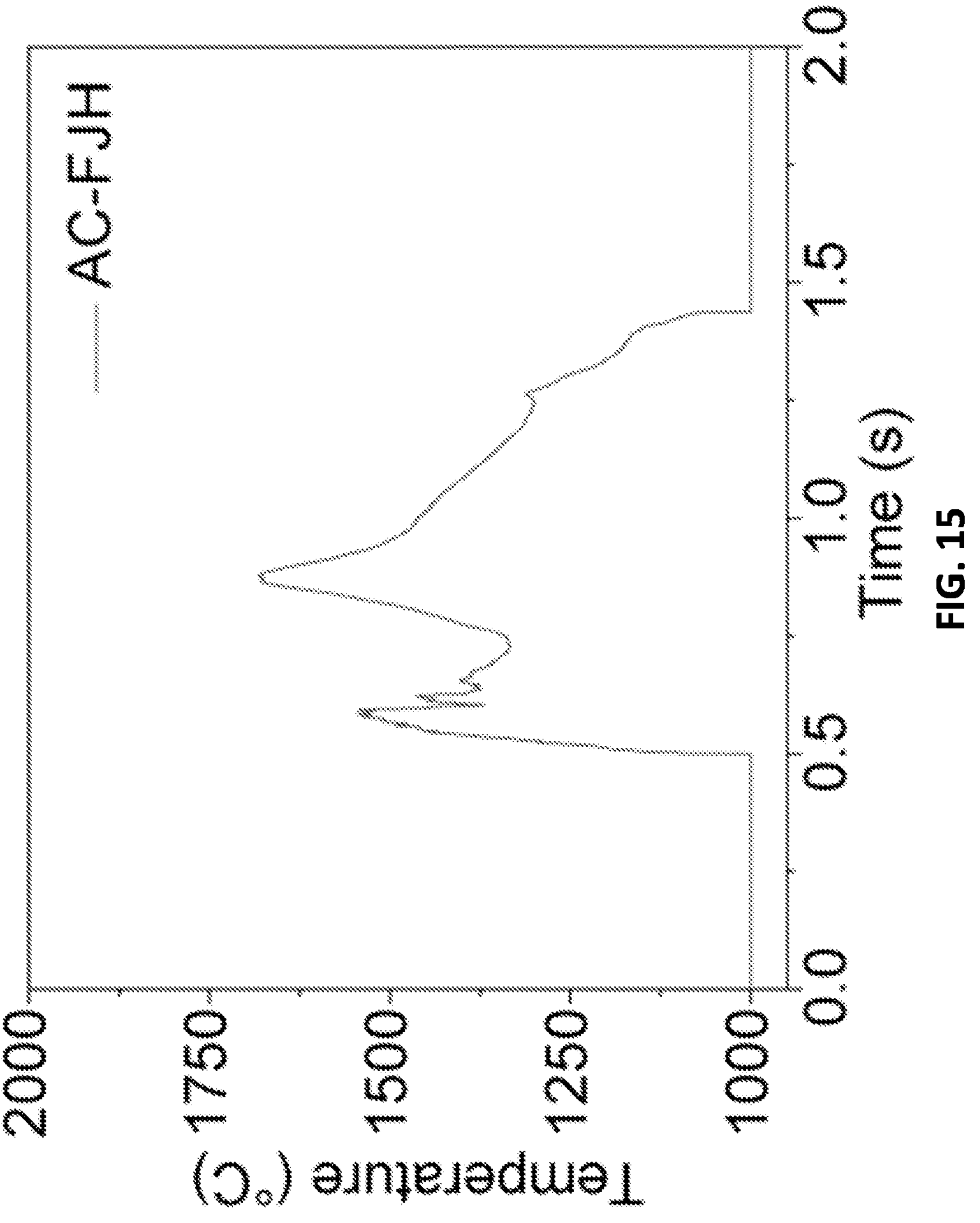
FIG. 15 shows temperature curve of the AC-FJH.

The AC-FJH system can include two circuit breakers to avoid the electricity overload. See FIGS. 14A-14B. Standard AC electricity with voltage of 120 V and frequency of 60 Hz was used. Similar with the DC-FJH, the concentration of heavy metals in the r-Soil was reduced after the AC-FJH. FIG. 14C. The removal efficiencies were calculated to be 40-80% for different heavy metals after one FJH pulse. The removal efficiencies were relatively smaller than those for the DC-FJH. FIG. 5B. This is due to the lower temperature of the AC-FJH process (FIG. 15), which is limited by the accessible AC sources (120 V) being utilized.

According to calculations using Equations (3)-(12) discussed above, the temperature could be improved when the voltage is increased. In industry, high voltage or even ultrahigh voltage technologies are well-established [Wen 2014; Chen 2015], that could be introduced for further improvement of the removal efficiencies.

Advantages and Applications

Soil contamination constitutes a significant environmental issue. With the increasing population and increased demand for agriculture, soil contamination has become a global environmental problem. The process to remove heavy metal contaminants in soil is significant for the sustainability of soil and environmental protection. Moreover, the flash Joule heating process of embodiments of the present invention could also be used to treat the solid waste disposals, for examples, the contaminants from Superfund sites.

For the soil remediation by flash Joule heating, embodiment of the present invention provide: (i) the flash Joule heating is a completely dry process without use of any solvent, while in previous soil washing processes, much wastewater was produced; (ii) the flash Joule heating could remove most of the heavy metals in contaminated soils in one step, including Cd, Hg, Pb, Cu, Ni, Co, etc., which is hard to be realized by other methods due to the different properties of these elements; (iii) the FJH is a general process to remove both the organic and inorganic contaminants; and (iv) the energy conversion efficiency of the flash Joule heating process is high, so the recovery by FJH is an energy-savings process.

For the soil remediation by FJH, the removal efficiency and the reduction of the concentration in soil can be performed to within the regulatory limits.

Embodiments of the present invention can include a Joule heating process based on pulsed direct current (PDC), such as discussed and described in the Tour PCT September 2021 Applications. Moreover, the voltage pulse can be performed utilizing direct current (DC), alternating current (AC), or both direct current (DC) and alternating current (AC). [Tour PCT September 2021 Applications]. The direct current (DC) and alternating current (AC) can be switched back and forth and/or concurrently used. [Tour PCT September 2021 Applications].

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

California Office of Environmental Health Hazard Assessment, "California human health screening levels," 2010, accessed at https://oehha.ca.gov/chhsltable/ ("Cal OEHHA 2010").

CDC, "Per- and Polyfluorinated Substances (PFAS) Factsheet," *National Biomonitoring Program,* 2021 ("CDC 2021").

OECD, "Toward a New Comprehensive Global Database of Per- and Polyfluoroalkyl Substances (PFASs): Summary Report on Updating the OECD 2007 List of Per- and Polyfluoroalkyl Substances (PFASs) (Report)," *Series on Risk Management No.* 39, 2007 ("OECD 2007").

New Jersey Department of Environmental Protection, "Estimated remediation costs," 2022, accessed at https://www.nj.gov/dep/special/hpctf/final/costs.htm ("NJDEP 2022").

US EPA, "PFAS structures in DSSTox (update August 2021), CompTox Chemicals Dashboard," 2021, Washington, DC ("US EPA 2021").

U.S. EPA, "Method 3550C: Ultrasonic Extraction," 2007, Revision 3. Washington, DC ("US EPA 2007").

U.S. EPA, "Method 3050B: Acid Digestion of Sediments, Sludges, and Soils," 1996, Revision 2, Washington, DC ("US EPA 1996").

Universal Matter, Ltd, "Universal Matter, Ltd, is commercially scaling up the FJH process," 2022, accessed at https://www.universalmatter.com/ ("Universal Matter 2022").

"Per- and polyfluoroalkyl substances," Wikipedia, 2022, accessed at https://en.wikipedia.org/wiki/Per-_and-_polyfluoroalkyl substances ("Wikipedia Page for PFAS").

Advincula, P. A., et al., "Flash graphene from rubber waste," *Carbon,* 2021, 178, 649-656 ("Advincula 2021").

Algozeeb, W. A., et al., "Flash graphene from plastic waste," *ACS Nano,* 2020, 14, 15595-15604 ("Algozeeb 2020").

Barbhuiya, N. H., et al., "The future of flash graphene for the sustainable management of solid waste," *ACS Nano,* 2021, 15, 15461-15470 ("Barbhuiya 2021").

Bolan, N., et al., "Remediation of heavy metal(loid)s contaminated soils—To mobilize or to immobilize?" *J. Hazard. Mater.,* 2014, 266, 141-166 ("Bolan 2014").

Chekol, T., et al., "Phytoremediation of polychlorinated biphenyl-contaminated soils: the rhizosphere effect," *Environ. Int.,* 2004, 30, 799-804 ("Chekol 2004").

Chen, W., et al., "Millisecond conversion of metastable 2D materials by flash Joule heating," *ACS Nano,* 2021, 15, 1282-1290 ("Chen I 2021").

Chen, W., et al., "Ultrafast and Controllable Phase Evolution by Flash Joule *Heating," ACS Nano* 2021, 15, 11158-11167 ("Chen 112021").

Chen, W., et al., "Foreword for the special section on AC and DC ultra high voltage technologies," *CSEE J. Power Energy Syst.,* 2015, 1, 1-2 ("Chen 2015").

Cheng, Y., et al., "Electric current aligning component units during graphene fiber Joule heating," *Adv. Funct. Mater.,* 2022, doi: 10.1002/adfm.202103493 ("Cheng 2022").

Deng, B., et al., "Phase controlled synthesis of transition metal carbide nanocrystals by ultrafast flash Joule heating," *Nat. Commun.,* 2022, 13, 262 ("Deng 12022").

Deng, B., et al., "Rare earth elements from waste," *Sci. Adv.,* 2022, 8, eabm3132 ("Deng II 2022").

Deng, B., et al., "Urban mining by flash Joule heating," *Nat. Commun.,* 2021, 12, 5794 ("Deng 2021").

Dermont, G., et al., "Soil washing for metal removal: A review of physical/chemical technologies and field applications," *J. Hazard. Mater.,* 2008, 152, 1-31 ("Dermont 2008").

Dong, Z.-Y., et al., "Remediation of soil co-contaminated with petroleum and heavy metals by the integration of electrokinetics and biostimulation," *J. Hazard. Mater.,* 2013, 260, 399-408 ("Dong 2013").

Ehlers, L. J., et al., "Contaminant Bioavailability In Soil And Sediment," *Environ Sci Technol,* 2003, 37(15), 295a-302a ("Ehlers 2003").

Galvez, M. E., et al., "Graphite formation by carbonate reduction during subduction," *Nat. Geosci.,* 2013, 6, 473-477 ("Galvez 2013").

Gan, S., et al., "Remediation Of Soils Contaminated With Polycyclic Aromatic Hydrocarbons (PAHs)," *J Hazard Mater,* 2009, 172(2-3), 532-549 ("Gan 2009").

Giger, W., et al., "Polycyclic aromatic hydrocarbons in the environment. *Isolation and* characterization by chromatography, visible, ultraviolet, and mass spectrometry," *Anal. Chem.,* 1974, 46, 1663-1671 ("Giger 1974").

Guo, B., et al., "Health risk assessment of heavy metal pollution in a soil-rice system: a case study in the Jin-Qu Basin of China," *Sci. Rep.,* 2020, 10, 11490 ("Guo 2020").

Guo, G., et al., "Availability and assessment of fixing additives for the in Situ remediation of heavy metal contaminated soils: A review," *Environ. Monit. Assess.,* 2006, 116, 513-528 ("Guo 2006").

Griffiths, R. A., "Soil-Washing Technology and Practice," *J Hazard Mater,* 1995, 40(2), 175-189 ("Griffiths 1995").

Hou, D., et al., "Metal contamination and bioremediation of agricultural soils for food safety and sustainability," *Nat. Rev. Earth Environ,* 2020, 1, 366-381 ("Hou 2020").

Houde M, et al., "Biological monitoring of polyfluoroalkyl substances: A review," *Environmental Science & Technology,* 2006, 40(11), 3463-73 ("Houde 2006").

Hussar, E., et al., "Human health risk assessment of 16 priority polycyclic aromatic hydrocarbons in soils of Chattanooga, Tennessee, USA," *Water Air Soil Pollut.,* 2012, 223, 5535-5548 ("Hussar 2012").

Kingston, J. L. T., et al., "Assessment of Groundwater Quality Improvements and Mass Discharge Reductions at Five In Situ Electrical Resistance Heating Remediation Sites," *Ground Water Monit R,* 2012, 32(3), 41-51 ("Kingston 2012").

Lestan, D., et al., "The use of chelating agents in the remediation of metal-contaminated soils: A review," *Environ. Pollut.,* 2008, 153, 3-13 ("Lestan 2008").

Lim, X. Z., "Maine's ban on 'forever chemicals' marks a big win for some scientists," *Science*, Aug. 27, 2021 ("Lim 2021").

Liu, C., et al., "Air-assisted transient synthesis of metastable nickel oxide boosting alkaline fuel oxidation reaction," *Adv. Mater.,* 2020, 10, 2001397 ("Liu C 2020").

Liu, J., et al., "The negative interaction between the degradation of phenanthrene and tricyclazole in medium, soil and soil/compost mixture," *Biodegradation,* 2008, 19, 695-703 ("Liu 2008").

Liu, S., et al., "Extreme environmental thermal shock induced dislocation-rich Pt nanoparticles boosting hydrogen evolution reaction," *Adv. Mater.,* 2022, 34, 2106973 ("Liu 2022").

Liu, S., et al., "Dislocation-strained IrNi alloy nanoparticles driven by thermal shock for the hydrogen evolution reaction," *Adv. Mater.,* 2020, 32, 2006034 ("Liu S 2020").

Liu, Y., et al., "A new strategy using nanoscale zero-valent iron to simultaneously promote remediation and safe crop production in contaminated soil" *Nat. Nanotechnol.,* 2021, 16, 197-205 ("Liu 2021").

Luong, D. X., et al., Gram-scale bottom-up flash graphene synthesis, *Nature,* 2020, 577, 647-651 ("Luong 2020").

Ma, J. W., et al., "Simultaneous removal of 2,4-dichlorophenol and Cd from soils by electrokinetic remediation combined with activated bamboo charcoal," *J. Hazard. Mater.,* 2010, 176, 715-720 ("Ma 2010").

Mueller, N. D., et al., "Closing Yield Gaps Through Nutrient And Water Management," *Nature,* 2012, 490(7419), 254-257 ("Mueller 2012").

Mulligan, C. N., et al., "Surfactant-enhanced remediation of contaminated soil: a review," *Eng. Geol.,* 2001, 60, 371-380 ("Mulligan 2001").

Perkins, T., "Maine bans toxic 'forever chemicals' under groundbreaking new law," *The Guardian*, Jul. 16, 2021 ("Perkins 2021).

Ruhl, L., et al., "Survey Of The Potential Environmental And Health Impacts In The Immediate Aftermath Of The Coal Ash Spill In Kingston, Tennessee," *Environ Sci Technol,* 2009, 43(16), 6326-633 ("Ruhl 2009").

Salt, D. E., et al., "Phytoremediation: A novel strategy for the removal of toxic metals from the environment using plants," *Bio/Technology,* 1995, 13, 468-474 ("Salt 1995").

Stanford, M. G., et al., "Flash graphene morphologies," *ACS Nano,* 2020, 14, 13691-13699 ("Stanford 2020").

Starý, V. R., et al., "Bio-compatibility of the surface layer of pyrolytic graphite," *Thin Solid Films,* 2003, 433, 191-198 ("Starý 2003").

Streche, C. et al., "Decontamination of petroleum-contaminated soils using the electrochemical technique: remediation degree and energy consumption," *Sci. Rep.* 2018, 8, 3272 ("Streche 2018").

Tripathi, V., et al., "Sustainable clean-up technologies for soils contaminated with multiple pollutants: Plant-microbe-pollutant and climate nexus," *Ecol. Eng.,* 2015, 82, 330-335 ("Tripathi 2015").

Vidali, M., "Bioremediation. An overview," *Pure Appl Chem,* 2001, 73(7), 1163-1172 ("Vidali 2001").

Wang, C. W., et al., "A general method to synthesize and sinter bulk ceramics in seconds," *Science,* 2020, 368, 521-526 ("Wang 2020").

Wen, T., et al., "3-MV compact very fast transient overvoltage generator for testing ultra-high-voltage gas-insulated switchgear," *IEEE Electr. Insul. Mag.,* 2014, 30, 26-33 ("Wen 2014").

Williams, P. N., et al., "Occurrence and Partitioning of Cadmium, Arsenic and Lead in Mine Impacted Paddy Rice: Hunan, China," *Environ Sci Technol,* 2009, 43(3), 637-642 ("Williams 2009").

Wuana, R. A., et al., "Heavy metals in contaminated soils: A review of sources, chemistry, risks and best available strategies for remediation," *ISRN Ecol.,* 2011, 2011, 402647 ("Wuana 2011").

Wyss, K. M., et al., "Converting plastic waste pyrolysis ash into flash graphene," *Carbon,* 2021, 174, 430-43 ("Wyss 2021").

Xu, J., et al., "Remediation of heavy metal contaminated soil by asymmetrical alternating current electrochemistry," *Nat. Commun.,* 2019, 10, 2440 ("Xu 2019").

Yao, Y. G., et al., "Carbothermal shock synthesis of high-entropy-alloy nanoparticles," *Science,* 2018, 359, 1489-1494 ("Yao 2018").

Ye, S., et al., "Biological technologies for the remediation of co-contaminated soil," *Crit. Rev. Biotechnol.,* 2017, 37, 1062-1076 ("Ye 2017").

Zhang, H., et al., "Non-thermal plasma technology for organic contaminated soil remediation: A review," *Chem. Eng. J.,* 2017, 313, 157-170 ("Zhang H 2017").

Zhang, J., et al., "Immediate remediation of heavy metal (Cr(VI)) contaminated soil by high energy electron beam irradiation," *J. Hazard. Mater.,* 2015, 285, 208-211 ("Zhang 2015").

Zhang, S., et al., "Uptake and translocation of polycyclic aromatic hydrocarbons (PAHs) and heavy metals by maize from soil irrigated with wastewater," *Sci. Rep.* 2017, 7, 12165 ("Zhang S 2017").

Zhao, C., et al., "Thermal desorption for remediation of contaminated soil: A review," *Chemosphere,* 2019, 221, 841-855 ("Zhao 2019").

Zhou, Z., et al., "Persulfate-based advanced oxidation processes (AOPs) for organic-contaminated soil remediation: A review," *Chem. Eng. J.,* 2019, 372, 836-851 ("Zhou 2019").

What is claimed is:

1. A method of soil remediation, wherein the method comprises:

(a) mixing contaminated soil with a conductive additive to form a mixture, wherein the contaminated soil comprises one or more pollutants; and (b) applying a voltage across the mixture utilizing a flash Joule heating process, wherein (i) the voltage is applied in one or more voltage pulses, (ii) duration of each of the one or more pulses is for a duration period, (iii) the one or more voltage pulses increase the temperature of the mixture to at least 1000 K, and (iv) the application of the voltage across the mixture decomposes and/or removes the pollutants from the contaminated soil to form remediated soil, wherein the application of the voltage across the mixture to decompose and/or remove the pollutants is performed without using a solvent to apply the voltage.

2. The method of claim 1, wherein the one or more pollutants are selected from a group consisting of organic pollutants, metals, metalloids, heavy metals, toxic heavy metals, rare earth metals, main group metals, and transition metals.

3. The method of claim 2, wherein the one or more pollutants comprises one or more organic pollutants.

4. The method of claim 3, wherein the voltage applied in the one more voltage pulses decomposes at least one of the one or more organic pollutants.

5. The method of claim 4, wherein the at least one of the one or more organic pollutants decompose by at least one of graphitization and graphene formation.

6. The method of claim 2, wherein the voltage applied in the one or more voltage pulses removes at least one of the one or more organic pollutants.

7. The method of claim 6, wherein the one or more organic pollutants are removed by at least one of boiling, sublimation, and vaporization of the one or more organic pollutants.

8. The method of claim 2, wherein the one or more organic pollutants are organic pollutants selected from a group consisting of polycyclic aromatic hydrocarbons (PAH), polychlorinated biphenyl (PCB), organochlorine pesticides (OCP), halogenated flame retardants, hydrocarbons, halogenated organic compounds, halogenated aromatics, total petroleum hydrocarbons (TPH), and per- and polyfluoroalkyl substances (PFAS).

9. The method of claim 8, wherein the one or more organic pollutants comprise one or more polycyclic aromatic hydrocarbons (PAH).

10. The method of claim 9, wherein the one or more polycyclic aromatic hydrocarbons (PAH) are selected from a group consisting of pyrene, fluorene, and benz[a]anthracene.

11. The method of claim 2, wherein
 (a) the one or more pollutants comprises one or more metal pollutants, and
 (b) the one or more metal pollutants is selected from a group consisting of metals, metalloids, heavy metals, toxic heavy metals, rare earth metals, main group metals, and transition metals.

12. The method of claim 1, wherein at least 40% of the one or more pollutants in the contaminated soil are decomposed and/or removed by the method.

13. The method of claim 12, wherein between 40% and 90% of the one or more pollutants in the contaminated soil are decomposed and/or removed by the method.

14. The method of claim 1, wherein the one or more voltage pulses increase the temperature of the mixture to at least 1500 K.

15. The method of claim 1, wherein the one or more voltage pulses increase the temperature of the mixture to at least 2000 K.

16. The method of claim 1, wherein the one or more voltage pulses increase the temperature of the mixture to at least 2500 K.

17. The method of claim 1, wherein the one or more voltage pulses increase the temperature of the mixture to at least 3000 K.

18. The method of claim 1, wherein the method is performed in a continuous process.

19. The method of claim 18, wherein the continuous process comprises
 (a) loading the mixture into a cell;
 (b) compressing the mixture within the cell;
 (c) applying the voltage across the mixture within the cell; and
 (d) unloading the remediated soil from the cell.

20. A system for performing the method of soil remediation utilizing the method of claim 1, wherein the system comprises:
 (a) a source of the mixture comprising the contaminated soil and the conductive additive;
 (b) a cell operably connected to the source such that the mixture can be flowed into the cell and held under compression;
 (c) electrodes operatively connected to the cell containing the mixture; and
 (d) a flash power supply for applying a voltage across the mixture in the cell to form the remediated soil from the mixture, wherein the flash power supply is operable to apply the voltage across the mixture to form the remediated soil without using a solvent to apply the voltage.

21. The system of claim 20, wherein the system is operable to perform a continuous process.

22. The system of claim 20, wherein the cell is movable.

23. The system of claim 20 further comprising a reservoir for collecting the remediated soil.

24. The system of claim 20, wherein the system is operable to perform an autonomous process.

25. The system of claim 20, wherein the flash power supply for applying the voltage across the mixture is operable for performing a flash Joule heating process.

26. A method of soil remediation, wherein the method comprises:
 (a) mixing contaminated soil with a conductive additive to form a mixture, wherein the contaminated soil comprises one or more pollutants; and
 (b) applying a voltage across the mixture utilizing a flash Joule heating process, wherein
  (i) the voltage is applied in one or more voltage pulses,
  (ii) duration of each of the one or more pulses is for a duration period,
  (iii) the application of the voltage across the mixture decomposes and/or removes the pollutants from the contaminated soil to form remediated soil, wherein the application of the voltage across the mixture to decompose and/or remove the pollutants is performed without using a solvent to apply the voltage,
  (iv) the one or more pollutants are one or more organic pollutants, and
  (v) the one or more organic pollutants comprise one or more per- and polyfluoroalkyl substances (PFAS).

27. The method of claim 26, wherein the one or more per- and polyfluoroalkyl substances (PFAS) are selected from a group consisting of perfluorosulfonic acids and perfluorocarboxylic acids.

28. The method of claim 26, wherein the one or more per- and polyfluoroalkyl substances (PFAS) are selected from a group consisting of perfluorooctanesulfonic acid (PFOS) and perfluorooctanoic acid (PFOA).

29. A method of soil remediation, wherein the method comprises:
 (a) mixing contaminated soil with a conductive additive to form a mixture, wherein the contaminated soil comprises one or more pollutants; and
 (b) applying a voltage across the mixture utilizing a flash Joule heating process, wherein
  (i) the voltage is applied in one or more voltage pulses,
  (ii) duration of each of the one or more pulses is for a duration period,
  (iii) the duration period of each of the one or more voltage pulses is between 1 microsecond and 20 seconds, and
  (iv) the application of the voltage across the mixture decomposes and/or removes the pollutants from the contaminated soil to form remediated soil, wherein the application of the voltage across the mixture to decompose and/or remove the pollutants is performed without using a solvent to apply the voltage.

* * * * *